United States Patent
Hasegawa et al.

(10) Patent No.: US 9,483,153 B2
(45) Date of Patent: Nov. 1, 2016

(54) TOUCH PANEL AND DISPLAY DEVICE

(71) Applicant: FUJIFILM Corporation, Tokyo (JP)

(72) Inventors: Kazuhiro Hasegawa, Kanagawa-Ken (JP); Kazuchika Iwami, Kanagawa-Ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/864,873

(22) Filed: Sep. 25, 2015

(65) Prior Publication Data

US 2016/0011700 A1 Jan. 14, 2016

Related U.S. Application Data

(63) Continuation of application No. PCT/JP2014/053586, filed on Feb. 17, 2014.

(30) Foreign Application Priority Data

Mar. 26, 2013 (JP) .................................. 2013-064381

(51) Int. Cl.
*G06F 3/044* (2006.01)
(52) U.S. Cl.
CPC ..... *G06F 3/044* (2013.01); *G06F 2203/04112* (2013.01); *Y10T 428/24802* (2015.01)
(58) Field of Classification Search
CPC .... G06F 13/041; G06F 13/044; G06F 3/041; G06F 3/044
See application file for complete search history.

(56) References Cited

U.S. PATENT DOCUMENTS

| 8,692,445 B2* | 4/2014 | Lee ..................... H01L 51/5212 313/112 |
| 2012/0031746 A1 | 2/2012 | Hwang et al. |
| 2012/0313880 A1 | 12/2012 | Geaghan et al. |
| 2014/0111711 A1 | 4/2014 | Iwami et al. |

FOREIGN PATENT DOCUMENTS

| JP | 2011074308 | 4/2011 | |
| JP | 2011517355 | 6/2011 | |
| JP | 2012094115 | 5/2012 | |
| JP | 2012234467 | 11/2012 | |
| JP | 2012533877 | 12/2012 | |
| JP | 2013054618 | 3/2013 | |
| KR | WO 2011008055 A2 * | 1/2011 | ........... H05K 9/0094 |

OTHER PUBLICATIONS

Machine translation of detailed description of JP 2012-234467 acquired on Apr. 22, 2016.*
International Search Report (Form PCT/ISA/210), mailed on Apr. 15, 2014, with English translation thereof, pp. 1-4.

* cited by examiner

*Primary Examiner* — Gerard Higgins
(74) *Attorney, Agent, or Firm* — Jianq Chyun IP Office

(57) ABSTRACT

A touch panel and a display device are disclosed. The shapes of a plurality of cells formed by crossing of silver fine wires that constitute a first electrode or a second electrode are different from each other and do not have regularity (uniformity). In other words, the cells are random. On the first electrode and/or the second electrode shaped as above, an adhesive (OCA) having a loss factor (tan δ) of 0.13 or more at 140° C. and 1 Hz and a storage elastic modulus of 8.9×10⁴ Pa or less at 25° C. and 1 Hz is disposed.

6 Claims, 19 Drawing Sheets

TOUCH PANEL AND DISPLAY DEVICE

CROSS-REFERENCE TO RELATED APPLICATIONS AND PRIORITY CLAIMS

This application is a Continuation of International Application No. PCT/JP2014/053586 filed on Feb. 17, 2014, which was published under PCT Article 21(2) in Japanese, which is based upon and claims the benefit of priority from Japanese Patent Application No. 2013-064381 filed on Mar. 26, 2013, the contents all of which are incorporated herein by reference.

TECHNICAL FIELD

The present invention relates to a touch panel and a display device, and more particularly to a touch panel and a display device that are provided with electrodes represented by a random mesh pattern.

BACKGROUND ART

Touch panels are provided with sensors, which detect the position where the touch panel surface is pressed by an object (e.g., a finger). Each of such sensors includes first electrodes and second electrodes, which extend perpendicularly to each other. As is well known in the art, an insulating layer is interposed between the first electrodes and the second electrodes.

The first electrodes and the second electrodes comprise a mesh made up of intersecting fine lines of metal. Spaces, which are surrounded by the intersecting fine lines of metal, also are referred to as cells. Recently, attempts have been made in display devices including touch panels to incorporate an irregularly shaped mesh of electrodes in order to prevent generation of moire phenomena (interference fringes) due to the geometrical relationship between the electrodes and the pixels that make up the display screen. In other words, the shapes of the cells are irregular (non-uniform), i.e., are of a random pattern (see Japanese Laid-Open Patent Publication No. 2011-517355 (PCT)). The fine lines of metal mostly comprise fine lines of silver (Ag) in view of electroconductivity, cost, color, etc., which are taken into account.

As disclosed in Japanese Laid-Open Patent Publication No. 2011-074308, a first electrode layer, which includes the first electrodes arranged in the foregoing manner, or a second electrode layer, which includes the second electrodes arranged in the foregoing manner, is applied to a display device, a board, an optical sheet, or the like by an optically clear adhesive (OCA). Since the first electrode layer or the second electrode layer is convexly shaped toward the insulating layer, which serves as a base, steps are formed between the insulating layer and the first electrode layer or the second electrode layer. The OCA is required to cover both the insulating layer and the first electrode layer or the second electrode layer adequately regardless of such steps (better step conformability).

SUMMARY OF INVENTION

It is effective to reduce the cell pitch of the first electrodes or the second electrodes, reduce the widthwise dimension of the fine silver lines, and arrange the cells in an irregular random pattern in order to improve the touch panel in terms of image quality based on increased mesh visibility and transmittance, as well as to achieve a reduction in moire phenomena.

On the condition that the mesh shape is of a random pattern, cells having different areas are disposed adjacent to each other, and some of the cells are spaced at small pitches whereas some have acute angles. As a result of an intensive study made by the inventors of the present invention, it has been found that in a case where an OCA is applied, residual stresses applied from the OCA to the fine silver lines tend to be localized due to the cell pitch differences. Furthermore, depending on the type of OCA used, new stresses are likely to develop in the fine silver lines due to shrinkage upon curing of the OCA, and the difference between coefficients of thermal expansion of the OCA and the fine silver lines or the base.

As a consequence, it has been found that in the case where an OCA having a low stress relaxation capability is applied to a mesh of electrodes in the form of fine silver lines having a random pattern, residual stresses are developed locally in the fine silver lines, tending to cause stress migration. As the mesh pattern becomes more irregular, stress migration is even more likely to occur, changing the resistance values of the first electrode layer or the second electrode layer, and breaking interconnections between the first electrode layer and the second electrode layer.

Recent attempts have been made to reduce the widthwise dimension of the fine silver lines as much as possible, e.g., to 4 μm or less, in order to increase visibility of the touch panel. However, stress migration becomes most distinctive in a case where the widthwise dimension of the fine silver lines is reduced as much as possible. In a case where the cells have acute-angled intersecting portions, gaps are likely to be formed between the acute-angled intersecting portions and the OCA, tending to cause ion migration.

A major object of the present invention is to provide a touch panel, which employs an OCA having a good stress relaxation capability, and hence prevents fine silver lines from developing migration such as stress migration.

A further object of the present invention is to provide a display device, which is provided with such a touch panel.

The above objects can be accomplished by the following arrangements [1] through [6].

[1] A touch panel having a first electrode layer and a second electrode layer, which face each other with an insulating layer interposed therebetween, wherein:

the first electrode layer includes a plurality of first electrodes extending along a first direction and arrayed parallel to each other along a second direction perpendicular to the first direction;

the second electrode layer includes a plurality of second electrodes extending along the second direction and arrayed parallel to each other along the first direction;

at least one of either the first electrodes or the second electrodes comprises a mesh pattern made up of fine silver lines;

the mesh pattern includes a plurality of cells defined by the fine silver lines crossing each other and having shapes that differ from each other as viewed in plan;

the cells have respective areas whose standard deviation lies within a range of 0.017 mm$^2$ to 0.038 mm$^2$; and an adhesive whose loss coefficient tan δ at 140° C. and 1 Hz is 0.13 or greater, and whose storage elastic modulus at 25° C. and 1 Hz is 8.9×10$^4$ Pa or less is disposed on at least one of either the first electrodes or the second electrodes that comprise the mesh pattern and the insulating layer.

The touch panel employs an adhesive (OCA) having prescribed properties. Since the OCA exhibits an excellent ability to conform to steps and to relax stresses, and adequately covers the electrodes where the cells are of a random pattern, gaps are unlikely to be formed between the electrodes and the OCA. Therefore, the silver of the fine silver lines is prevented from suffering stress migration.

In a case where the fine silver lines have a widthwise dimension of 4 µm or less, particularly 2 µm or less, the resistance value of the fine silver lines (electrodes) tends to change easily due to stress migration caused by residual stresses. According to the present invention, which uses the aforementioned OCA, even though the electrodes are made up of very fine lines, the resistance value of the electrodes is prevented from changing.

[2] The mesh pattern may be made of a combination of the first electrodes and the second electrodes.

[3] Each of the fine silver lines may have a widthwise dimension of 4 µm or less.

[4] Preferred specific examples of the adhesive include the following components (A) through (C).

(A): An alkyl(meth)acrylate monomer whose glass transition temperature Tg is 25° C. or lower (the alkyl group has 4 through 18 carbon atoms);

(B): An ester of (meth)acrylate monomer whose glass transition temperature Tg is in excess of 25° C.; and (C): A monomer selected from a group of hydroxyalkyl (meth)acrylate, unsubstituted (meth)acrylamide, N-alkyl-substituted (meth)acrylamide, N,N-dialkyl-substituted (meth)acrylamide, a monomer having a urea functional group, and a monomer having a lactam functional group, a tertiary amine, an alicyclic amine, an aromatic amine, or a combination of such materials.

[5] The adhesive may contain a migration inhibitor comprising at least either one of a phenolic compound or a mercapto-group-containing heterocyclic compound.

[6] Either the first electrodes or the second electrodes, which comprise the mesh pattern, may be formed by a microcontact printing patterning process or a silver salt process.

The present invention also concerns a display device, which includes the above touch panel.

Since the touch panel according to the present invention uses the adhesive that exhibits prescribed properties, silver of the fine silver lines that serve as the electrodes is prevented from suffering migration.

The above and other objects, features, and advantages of the present invention will become more apparent from the following description of preferred embodiments when taken in conjunction with the accompanying drawings.

DESCRIPTION OF EMBODIMENTS

A touch panel according to a preferred embodiment of the present invention will be described in detail below with reference to the accompanying drawings. In the following description, the symbol "– (to)" that is used to represent numerical ranges shall be interpreted as including numerical values representative of upper and lower limits of the numerical ranges.

Figure 1:
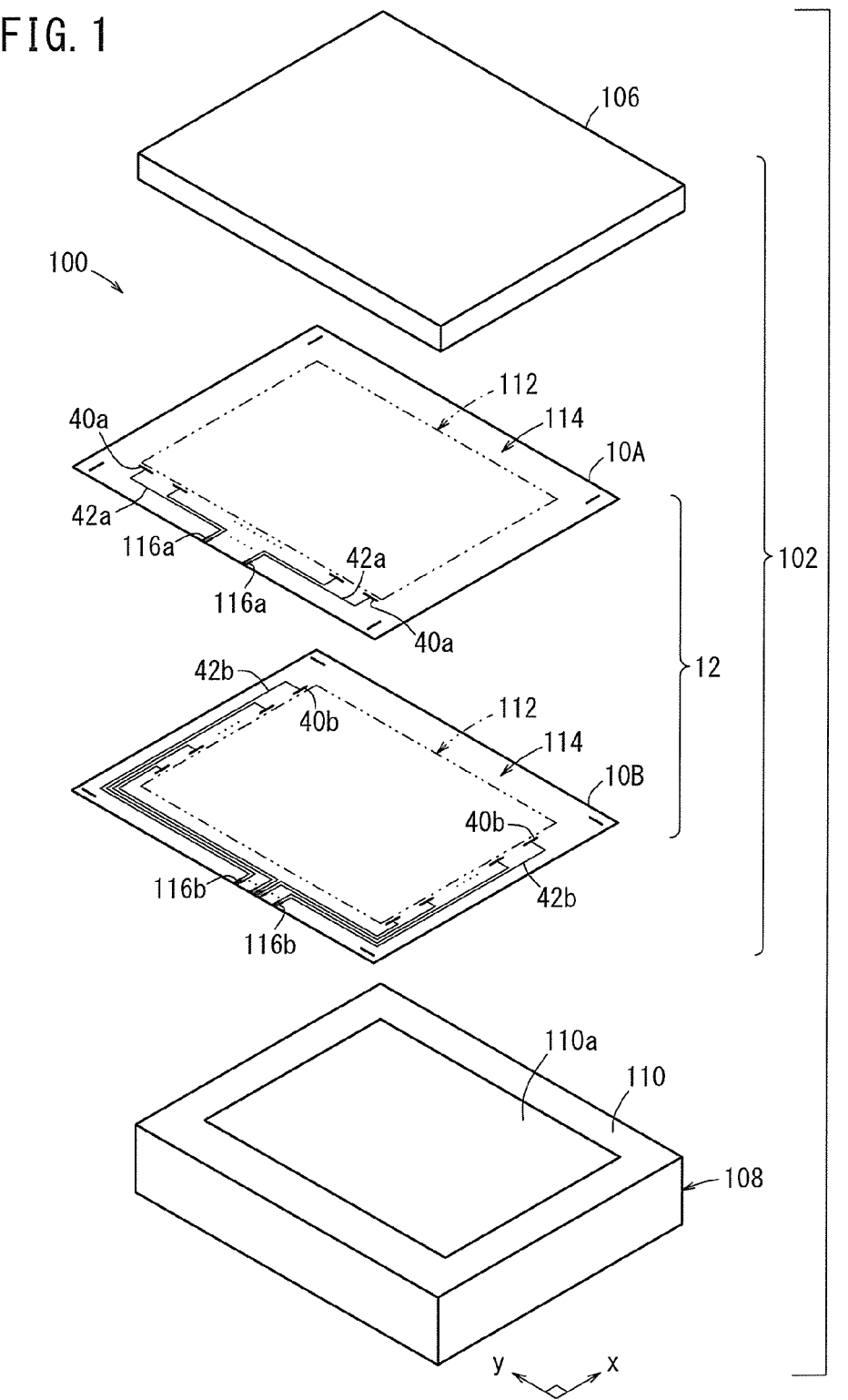
FIG. 1 is an exploded perspective view of a central portion of a touch panel according to an embodiment of the present invention.

FIG. 1 is an exploded perspective view of a central portion of a touch panel 100 according to an embodiment of the present invention. The touch panel 100 includes a main sensor assembly 102 and a non-illustrated control circuit (an IC or the like).

The main sensor assembly 102 includes a laminated electroconductive sheet assembly 12 made up of a first electroconductive sheet 10A and a second electroconductive sheet 10B, which are stacked together, and a protective layer 106 stacked on the first electroconductive sheet 10A. The main sensor assembly 102 (the laminated electroconductive sheet assembly 12 and the protective layer 106) is disposed on a display panel 110 of a display device 108 such as a liquid crystal display or the like, for example. As viewed from above, the main sensor assembly 102 has a touched position sensor area 112 positioned in alignment with a display screen 110a of the display panel 110, and a terminal interconnect area 114 (a so-called frame) disposed in alignment with an outer peripheral region of the display panel 110.

Figure 2:
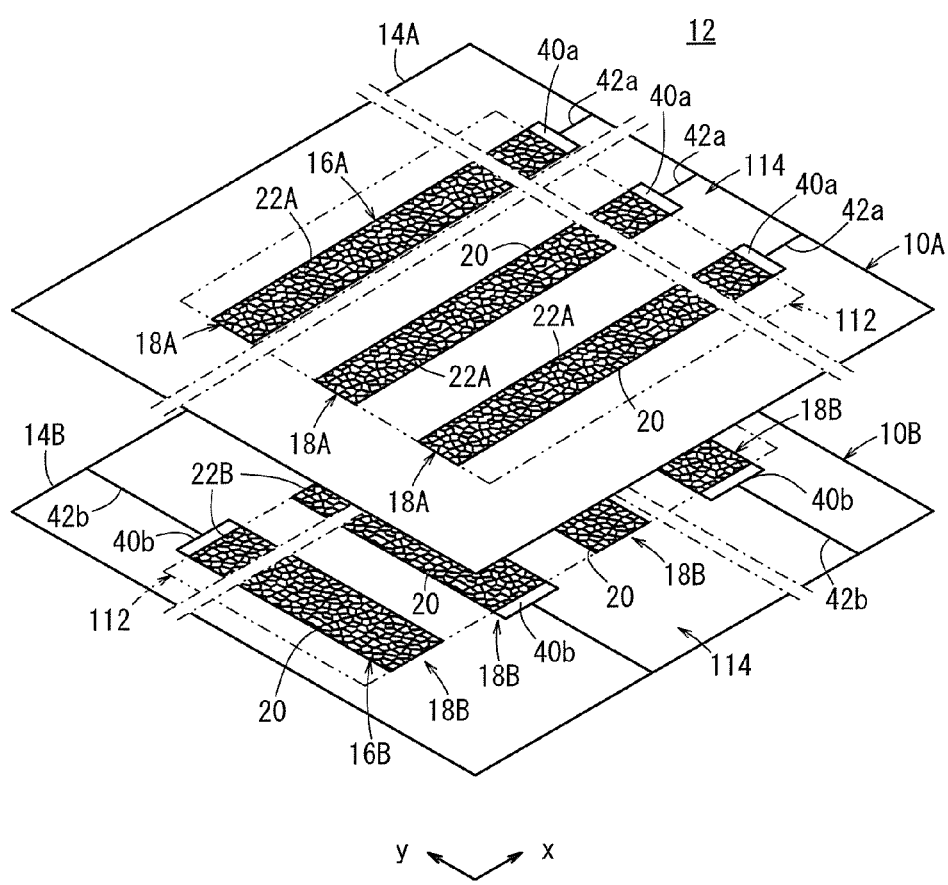
FIG. 2 is a fragmentary exploded perspective view of a laminated electroconductive sheet of the touch panel.

As shown in FIG. 2, the laminated electroconductive sheet assembly 12 is made up of the first electroconductive sheet 10A and the second electroconductive sheet 10B, which are stacked together.

Figure 3:
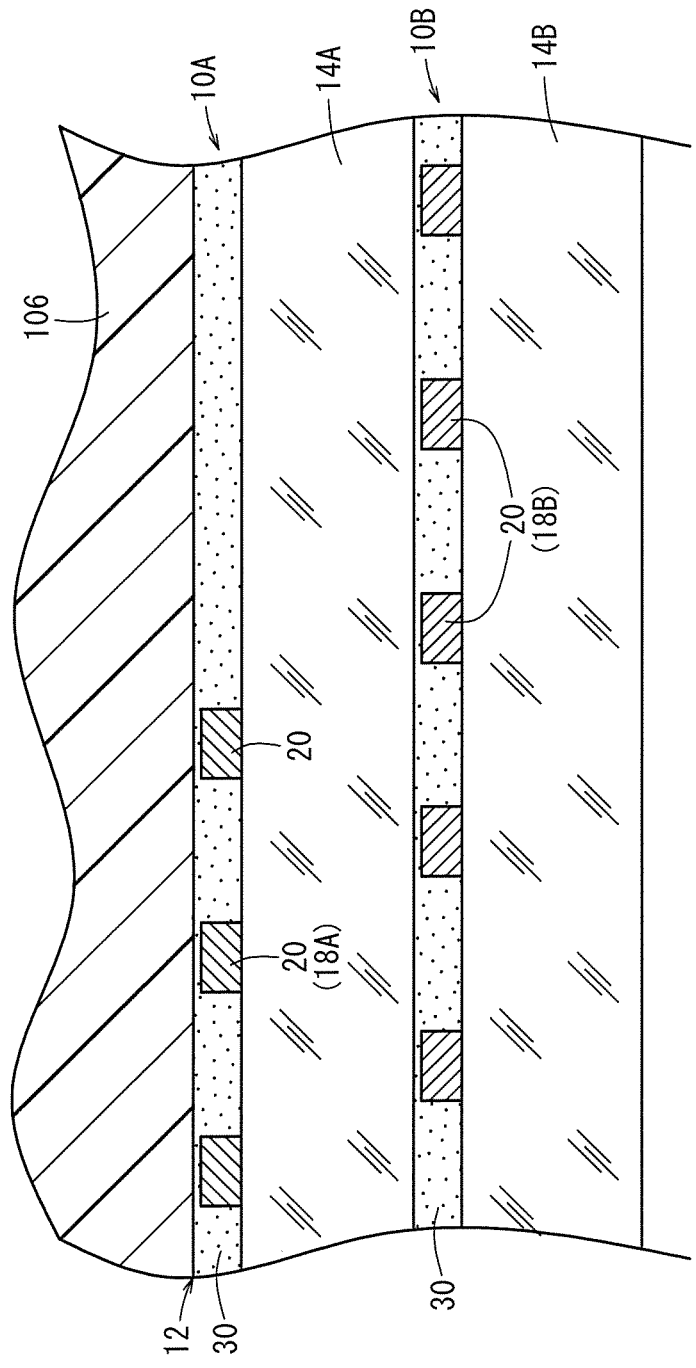
FIG. 3 is a schematic vertical cross-sectional view of the laminated electroconductive sheet.

The first electroconductive sheet 10A has a first electroconductive area 16A, which serves as a first electrode layer, disposed on a principal surface of a first transparent base 14A (see FIG. 3), which serves as an insulating layer. Similarly, as shown in FIGS. 2 and 3, the second electroconductive sheet 10B has a second electroconductive area 16B, which serves as a second electrode layer, disposed on a principal surface of a second transparent base 14B (see FIG. 3), which serves as an insulating layer.

The thickness of the first transparent base 14A and the second transparent base 14B preferably is in a range of 50-350 μm, more preferably, is in a range of 80-250 μm, and particularly preferably, is in a range of 100-200 μm.

Each of the first transparent base 14A and the second transparent base 14B may comprise a plastic film, a plastic plate, a glass plate, or the like.

The plastic film and the plastic plate may be made up of a polyester such as polyethylene terephthalate (PET), polyethylene naphthalate (PEN), or the like, a polyolefin such as polyethylene (PE), polypropylene (PP), polystyrene, polyethylene vinyl acetate (EVA), or the like, a vinyl-based resin, polycarbonate (PC), polyamide, polyimide, acrylic resin, triacetyl cellulose (TAC), or the like.

The first transparent base 14A and the second transparent base 14B preferably are made up of a plastic film or a plastic plate, with a melting point equal to or lower than about 290° C., such as PET (melting point: 258° C.), PEN (melting point: 269° C.), PE (melting point: 135° C.), PP (melting point: 163° C.), polystyrene (melting point: 230° C.), polyvinyl chloride (melting point: 180° C.), polyvinylidene chloride (melting point: 212° C.), or TAC (melting point: 290° C.). In particular, PET is preferable from the standpoint of light permeability, processability, etc. Since electroconductive films such as the first electroconductive sheet 10A and the second electroconductive sheet 10B are required to be transparent on the condition that they are used as the laminated electroconductive sheet assembly 12, the first transparent base 14A and the second transparent base 14B preferably are highly transparent.

As shown in FIG. 2, the first electroconductive area 16A has a plurality of strip-like first electroconductive patterns 18A (first electrodes), each of which extends in a first direction (x direction). The first electroconductive patterns 18A are arrayed along a second direction (a direction perpendicular to the first direction: y direction).

Each of the first electroconductive patterns 18A is made up of intersecting fine silver lines 20. The intersecting fine silver lines 20 define spaces (interstices), i.e., a plurality of cells 22A, which are surrounded by the fine silver lines 20.

Figure 4:
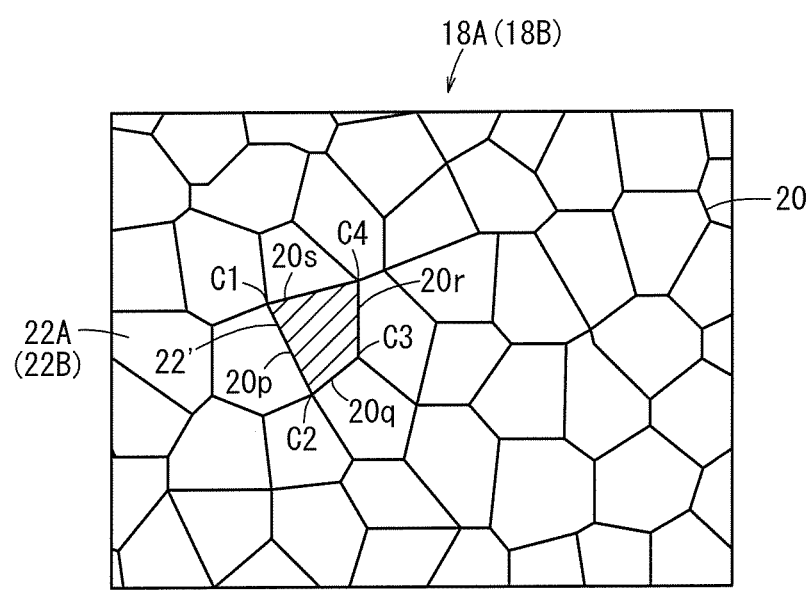
FIG. 4 is a schematic plan view showing cells of first electrodes on the laminated electroconductive sheet.

As shown in FIG. 4, the cells 22A have respective shapes that differ from each other, and are low in regularity (uniformity). Stated otherwise, the first electroconductive patterns 18A, which are formed of fine silver lines 20, are in the form of a random mesh pattern. For example, the cell 22', which is shown in hatching, is of a quadrangular shape and is made up of a fine silver line $20p$ that linearly interconnects a vertex C1 and a vertex C2, a fine silver line $20q$ that linearly interconnects the vertex C2 and a vertex C3, a fine silver line $20r$ that linearly interconnects the vertex C3 and a vertex C4, and a fine silver line $20s$ that linearly interconnects the vertex C4 and the vertex C1. As can be understood from FIG. 4, each of the cells 22A is of a polygonal shape having at least three sides.

The term "polygonal shape" referred to in the present description covers not only a geometrically perfect polygonal shape, but also a "substantially polygonal shape" which varies slightly from a perfect polygonal shape. Examples of such a slight variation include an added point or a line element, which is minute compared with the cells 22A, and a partial loss or the like of the sides (fine silver lines 20) of the cells 22A. Further, shapes having one or more sides thereof that are curved will also be referred to as polygonal shapes.

The shape of the random mesh pattern may be established based on a Voronoi process or a Delaunay triangulation process, for example.

The openings of the mesh patterns may be deformed, as illustrated in FIGS. 6A through 6D, 7A through 7D.

The widthwise dimension of the fine silver lines 20 is not limited to any particular value, but may be set to a value equal to or less than 10 μm, and more preferably, a value equal to or less than 4 μm. The random shapes of the cells 22A and the small line width of the fine silver lines 20 in combination improve the effect of moire phenomena on the electroconductive patterns for enhancing visibility. It is possible for the line width to be 2 μm or less. In order to improve the detection sensitivity of the touch panel 100, the line width of each of the fine silver lines 20 preferably is equal to or greater than 0.5 μm.

As shown in FIG. 2, one end of each of the first electroconductive patterns 18A is electrically connected by a first connector 40a to a first terminal interconnect pattern 42a in the form of a fine silver line 20.

As shown in FIG. 2, the second electroconductive area 16B, which is disposed on a principal surface of the second transparent base 14B (see FIG. 3) of the second electroconductive sheet 10B, has a plurality of strip-like second electroconductive patterns 18B (second electrodes), each of which extends in a second direction (y direction). The second electroconductive patterns 18B are arrayed along the first direction (x direction). Therefore, as shown in FIG. 3, in the laminated electroconductive sheet assembly 12, the first electroconductive patterns 18A and the second electroconductive patterns 18B confront each other with the first transparent base 14A interposed therebetween.

Each of the second electroconductive patterns 18B also is formed of intersecting fine silver lines 20. The intersecting fine silver lines 20 define spaces (interstices), i.e., cells 22B, which are surrounded by the intersecting fine silver lines 20.

The second electroconductive patterns 18B are of a random mesh pattern, similar to the first electroconductive patterns 18A. More specifically, the cells 22B have respective shapes that differ from each other, similar to the cells 22A, and are low in regularity (uniformity). The preferred line width of the fine silver lines 20 of the cells 22B and the reasons therefor, as well as the process of determining the interconnecting shapes of the cells 22B, are the same as with the cells 22A, and thus such features will not be described in detail.

As shown in FIG. 2, one end of each of the second electroconductive patterns 18B is connected electrically by a second connector 40b to a second terminal interconnect pattern 42b in the form of a fine silver line 20.

As shown in FIG. 2, the first electroconductive sheet 10A, which is applied to the touch panel 100, includes a number of the above-described first electroconductive patterns 18A, which are arrayed in a portion corresponding to the sensor area 112, and a plurality of first terminal interconnect patterns 42a, each of which is in the form of a fine silver line 20 that extends from respective first connectors 40a, and which are arrayed in the terminal interconnect area 114.

In the example shown in FIG. 1, the first electroconductive sheet 10A has a contour, which is of a rectangular shape as viewed in plan, and the sensor area 112 also has a rectangular shaped contour. A plurality of first terminals 116a are disposed in a longitudinally central area of a peripheral edge portion of the terminal interconnect area 114 on a longer side of the first electroconductive sheet 10A. The first terminals 116a are arrayed longitudinally on the longer side of the first electroconductive sheet 10A. A plurality of first connectors 40a are arrayed linearly along a longer side of the sensor area 112 (a longer side closest to the longer side of the first electroconductive sheet 10A: y direction). The first terminal interconnect patterns 42a, which extend from the respective first connectors 40a, are directed toward a substantially central area of the longer side of the first electroconductive sheet 10A, and are electrically connected to corresponding first terminals 116a.

Therefore, the first terminal interconnect patterns 42a, which are connected to corresponding first connectors 40a on both sides of the longer side of the sensor area 112, have substantially the same length. Consequently, the transfer of signals can be prevented from suffering from a local delay. This leads to an increase in response speed.

As shown in FIG. 2, the second electroconductive sheet 10B has a number of second electroconductive patterns 18B, which are arrayed in a portion corresponding to the sensor area 112, and a plurality of second terminal interconnect patterns 42b that extend from respective second connectors 40b, and which are arrayed in the terminal interconnect area 114.

As shown in FIG. 1, a plurality of second terminals 116b are disposed in a longitudinally central area of a peripheral edge portion of the terminal interconnect area 114 on a longer side of the second electroconductive sheet 10B. The second terminals 116b are arrayed longitudinally on the longer side of the second electroconductive sheet 10B. A plurality of second connectors 40b (e.g., odd-numbered second connectors 40b) are arrayed linearly along a shorter side of the sensor area 112 (a shorter side closest to the shorter side of the second electroconductive sheet 10B: x direction), and a plurality of second connectors 40b (e.g., even-numbered second connectors 40b) are arrayed linearly along another shorter side of the sensor area 112 (a shorter side closest to the other shorter side of the second electroconductive sheet 10B: x direction).

Among the plurality of second electroconductive patterns 18B, odd-numbered second electroconductive patterns 18B, for example, are connected to corresponding odd-numbered second connectors 40b, and even-numbered second electroconductive patterns 18B are connected to corresponding even-numbered second connectors 40b. The second terminal interconnect patterns 42b, which extend from respective odd-numbered second connectors 40b, and the second terminal interconnect patterns 42b, which extend from respective even-numbered second connectors 40b, are directed toward a substantially central area of one longer side of the second electroconductive sheet 10B, and are connected electrically to corresponding second terminals 116b. Therefore, the first and second terminal interconnect patterns 42b, for example, have substantially the same length. Similarly, the (2n−1)th and 2nth second terminal interconnect patterns 42b have substantially the same length. Inasmuch as the second terminals 116b are disposed in a longitudinally central area of one longer side of the second electroconductive sheet 10B, the transfer of signals is prevented from suffering from a local delay. This leads to an increase in response speed.

The first terminal interconnect patterns 42a may extend in the same manner as the above-described second terminal interconnect patterns 42b, or conversely, the second terminal interconnect patterns 42b may extend in the same manner as the above-described first terminal interconnect patterns 42a.

In a case where the laminated electroconductive sheet assembly 12 is used as a touch panel 100, the protective layer 106 is provided on the first electroconductive sheet 10A. The first terminal interconnect patterns 42a, which extend from the first electroconductive patterns 18A of the first electroconductive sheet 10A, and the second terminal interconnect patterns 42b, which extend from the second electroconductive patterns 18B of the second electroconductive sheet 10B, are connected to a control circuit that controls a scanning process, for example.

A touched position preferably is detected using a self-capacitance process or a mutual capacitance process. More specifically, according to the self capacitance process, voltage signals for detecting a touched position are supplied successively to the first electroconductive patterns 18A, and voltage signals for detecting a touched position are supplied successively to the second electroconductive patterns 18B. When a fingertip is brought into contact with or into proximity with the upper surface of the protective layer 106, the capacitance between the first electroconductive pattern 18A and the second electroconductive pattern 18B, which confront the touched position and GND (ground), increases. At this time, the signal waveforms transmitted from the first electroconductive pattern 18A and the second electroconductive pattern 18B become different from the signal waveforms that are transmitted from the other electroconductive patterns. Therefore, based on the signals transmitted from the first electroconductive pattern 18A and the second electroconductive pattern 18B, the control circuit can calculate the touched position.

According to the mutual capacitance process, voltage signals for detecting a touched position are supplied successively to the first electroconductive patterns 18A, for example, and a sensing process (for detecting a transmitted signal) is performed successively on the second electroconductive patterns 18B. When a fingertip is brought into contact with or into proximity with the upper surface of the protective layer 106, a stray capacitance of the finger is added in parallel with the parasitic capacitance between the first electroconductive pattern 18A and the second electroconductive pattern 18B, which confront the touched position. At this time, signal waveforms, which are transmitted from the second electroconductive pattern 18B, become different from the signal waveforms that are transmitted from the other second electroconductive patterns 18B. Therefore, based on a sequence of the first electroconductive patterns 18A, to which the voltage signals are supplied, and the supplied signal transmitted from the second electroconductive pattern 18B, the control circuit can calculate the touched position.

The self capacitance process or the mutual capacitance process, which is employed in the foregoing manner as a process for detecting a touched position, is capable of detecting touched positions when two fingertips are brought simultaneously into contact with or into proximity with the upper surface of the protective layer 106. Background art documents concerning projection-type electrostatic capacitance type detection circuits include U.S. Pat. No. 4,582,955, U.S. Pat. No. 4,686,332, U.S. Pat. No. 4,733,222, U.S. Pat. No. 5,374,787, U.S. Pat. No. 5,543,588, U.S. Pat. No. 7,030,860, and U.S. Patent Application Publication No. 2004/0155871.

In order to obtain patterns of reduced line width to serve as the first electroconductive patterns 18A and the second electroconductive patterns 18B, a microcontact printing patterning process or a silver salt process preferably is used. For repeatedly obtaining a large number of random patterns, the silver salt process, which does not use a wearable stamp, is particularly preferred.

The microcontact printing patterning process is a process for obtaining patterns of reduced line width on the basis of a microcontact printing process. Such a microcontact printing process is a process for fabricating a pattern of a monomolecular film by bringing a thiol solution, which functions as an ink, into contact with a gold base, using an elastic stamp of polydimethylsiloxane (see Angew. Chem. Int. Ed., p. 550, vol. 37, 1998, written by Whitesedes).

A typical process sequence of the microcontact printing patterning process is carried out in the following manner. First, a base is coated with a metal (e.g., a PET base is sputter-coated with silver).

Thereafter, according to the microcontact printing process, a mask made up of a monomolecular film is stamped onto the metal-coated base. Thereafter, metal is etched away from the metal-coated base, except for the pattern that resides under the mask.

Specific working details of the microcontact printing patterning process are described in paragraph [0104] of Japanese Laid-Open Patent Publication No. 2012-519329 (PCT).

The silver salt process obtains a mesh-like pattern of fine silver lines 20 by exposing to light and developing a photosensitive material having a photosensitive layer containing a silver salt. Specific working details of the silver salt process are described in paragraphs [0163] through [0241] of Japanese Laid-Open Patent Publication No. 2009-004348.

As shown in FIG. 3, an OCA 30, which serves as an adhesive, is disposed by being applied in the form of an adhesive sheet to an upper end surface of the second electroconductive sheet 10B (the second electroconductive patterns 18B and the second transparent base 14B) and an upper end surface of the first electroconductive sheet 10A (the first electroconductive patterns 18A and the first transparent base 14A).

The OCA 30 has a loss coefficient tan δ of 0.13 or greater at 140° C. and 1 Hz. According to the following equation (a), the loss coefficient is determined as a ratio of a loss elastic modulus and a storage elastic modulus.

$$\text{Loss coefficient}(\tan \delta)=\text{loss elastic modulus/storage elastic modulus} \quad (a)$$

The storage elastic modulus of the OCA 30 at 25° C. and 1 Hz is $8.9 \times 10^4$ Pa or less.

The aforementioned dynamic viscoelastic characteristics are important from the standpoint of conformability with the concavo-convex surfaces (step conformability) as well as the stress relaxation capability, because stress migration develops in relation to the stress relaxation capability and the initial residual stresses of the OCA 30.

If the value of tan δ, as an index of stress relaxation, is 0.13 or greater, then the OCA 30 tends to exhibit an excellent stress relaxation capability, and is likely to develop stress migration in conformity with the small cell pitches and acute-angled shapes of the random pattern. The value of tan δ preferably is 0.15 or greater, and more preferably, is 0.20 or greater. However, if the value of tan δ becomes excessively large, then the adhesiveness of the OCA 30 at high temperatures tends to decrease. To avoid such a reduction in adhesiveness, the value of tan δ should be 0.60 or less.

The storage elastic modulus represents an index of residual stress (initial residual stress) of the OCA 30, which is deformed to be applied to the fine silver lines. If the value of the storage elastic modulus is $8.9 \times 10^4$ Pa or less, then stress migration is relaxed. For example, even in a case where the OCA 30 is applied to the fine silver lines 20 in a random pattern having concavo-convex surfaces of about 1 μm, the OCA 30 does not produce local residual stresses and can suppress stress migration.

Even an OCA 30 having the above dynamic viscoelastic characteristics is not easily applicable to unacceptably irregular random patterns. Random patterns to which the OCA 30 can be applied are such that the standard deviation of the cell areas lies within a range of 0.017 mm² to 0.038 mm². If the standard deviation is less than 0.017 mm², the OCA 30 is not effective to improve moire phenomena. If the standard deviation exceeds 0.038 mm², stress migration is developed as well as moire phenomena and color noise.

As described above, in a case where an OCA, which is applied to the mesh electrodes made of the fine silver lines 20 arranged in a random pattern, exhibits a low stress relaxation capability, residual stresses are developed locally in the fine silver lines 20, tending to cause stress migration. However, according to the present embodiment, which employs the OCA having the above properties in which the standard deviation of the cell areas fall within a predetermined range, it is possible to prevent stress migration from being caused due to the random pattern.

The OCA 30 having such properties preferably contains the following components (A) through (C) for preventing both ion migration and whitening.

(A): An alkyl(meth)acrylate monomer whose glass transition temperature Tg is 25° C. or lower (the alkyl group has 4 through 18 carbon atoms);

(B): An ester of (meth)acrylate monomer whose glass transition temperature Tg is in excess of 25° C.; and (C): A monomer selected from a group of hydroxyalkyl (meth)acrylate, unsubstituted (meth)acrylamide, N-alkyl-substituted (meth)acrylamide, N,N-dialkyl-substituted (meth)acrylamide, a monomer having a urea functional group, and a monomer having a lactam functional group, a tertiary amine, an alicyclic amine, an aromatic amine, or a combination of such materials.

Component (A), i.e., an alkyl(meth)acrylate monomer whose alkyl group has 4 through 18 carbon atoms, preferably is such that the glass transition temperature of a polymer of one or plural monomers is 25° C. or less, in terms of the fact that the component (A) alone imparts sufficient adhesiveness (flexibility) to the OCA 30. More specifically, such a monomer, in which the glass transition temperature of a homopolymer is 25° C. or lower, may be selected, for example, from among alkyl(meth)acrylates such as n-butyl acrylate, isobutyl acrylate, isoamyl acrylate, hexyl acrylate, cyclohexyl acrylate, 2-ethylhexyl(meth)acrylate, isooctyl (meth)acrylate, isononyl(meth)acrylate, n-decyl(meth)acrylate, isodecyl(meth)acrylate, lauryl(meth)acrylate, isomyristyl(meth)acrylate, isocetyl(meth)acrylate, 2-octyldecyl (meth)acrylate, isostearyl(meth)acrylate, 2-methylbutyl acrylate, or the like, or a mixture thereof.

Among such materials, a preferable component (A) is alkyl acrylate, since alkyl acrylate exhibits excellent polymerizability according to either a thermal polymerization process or an optical polymerization process. More specifically, alkyl acrylate includes n-butyl acrylate, isobutyl acrylate, 2-ethylhexyl acrylate, isooctyl acrylate, isononyl acrylate, isodecyl acrylate, lauryl acrylate, isomyristyl acrylate, isocetyl acrylate, 2-octyldecyl acrylate, isostearyl acrylate, 2-methylbutyl acrylate, or the like. From the standpoint of adhesiveness, 2-ethylhexyl acrylate, isooctyl acrylate, and 2-methylbutyl acrylate are particularly preferable.

The "glass transition temperature (Tg)" of a homopolymer refers to a value measured according to JIS K7121. On the condition that a polymer, which has been heated and melted, is cooled under certain conditions, the polymer changes through a supercooled liquid state into a glass state. The glass transition temperature refers to the temperature at which the state of the polymer changes.

Component (B), i.e., an ester of (meth)acrylate monomer whose glass transition temperature Tg is in excess of 25° C., may be a linear or branched alkyl(meth)acrylate, such as methyl(meth)acrylate, ethyl(meth)acrylate, t-butyl(meth) acrylate, n-butyl methacrylate, isobutyl methacrylate, or the like, or an alicyclic alkyl(meth)acrylate such as cyclohexyl methacrylate, 4-t-butylcyclohexyl, (meth)acrylate, isobornyl(meth)acrylate, or the like. Among such materials, methyl(meth)acrylate, ethyl(meth)acrylate, and isobornyl(meth) acrylate are particularly preferable.

Component (C) is a component for increasing the cohesion force of the OCA 30 in order to impart adhesiveness thereto. On the touch panel 100, the component (C) prevents foaming and peeling, particularly at high temperatures.

Monomers of this type include, for example, a substituted acrylamide such as 2-hydroxyethyl(meth)acrylate, 3-hydroxypropyl(meth)acrylate, N,N-dimethyl(meth)acrylamide, N,N-diethyl(meth)acrylamide, N-t-butyl(meth)acrylamide, N,N-isopropyl(meth)acrylamide, N-t-octyl(meth) acrylamide, N,N-dimethylaminoethyl(meth)acrylamide, N,N-dimethylaminopropyl(meth)acrylamide, diacetone acrylamide, or the like, and a vinyl monomer such as N-vinylpyrrolidone, N-vinylcaprolactam, or the like. Among such materials, 2-hydroxyethyl(meth)acrylate and 3-hydroxypropyl(meth)acrylate are particularly preferable.

The tan δ value and the storage elastic modulus of the OCA 30 may be adjusted by appropriately changing the type, molecular weight, and composition of the above monomer components. For example, on the condition that component (C) is used in a large amount, then the storage elastic modulus becomes high, whereas on the condition that component (A) and component (B) are used in large amounts, then the storage elastic modulus becomes low. On the condition that the molecular weight of a copolymer made up of monomers containing component (A), component (B), and component (C) is increased, then the storage elastic modulus also tends to increase. Generally speaking, component (A) having a proportion represented by 45 to 95 parts by weight, component (B) having a proportion represented by 20 to 50 parts by weight, and component (C) having a proportion represented by 1 to 40 parts by weight are preferable, so as to achieve both migration and whitening.

The tan δ value of the OCA 30 may also be adjusted by adjusting the amount of a cross-linking agent, as will be described later. More specifically, in a case where the amount of the cross-linking agent is increased, the tan δ value is reduced, and in a case where the amount of the cross-linking agent is reduced, the tan δ value is increased.

The OCA 30 having the above properties exhibits a large stress relaxation capability. On the condition that the OCA 30 is applied to a mesh of electrodes in the form of fine silver lines arranged in a random pattern in which the standard deviation of the cell areas falls within a predetermined range, it is possible to prevent residual stresses from being developed locally in the fine silver lines 20, as well as to prevent stress migration from occurring due to such residual stresses.

The OCA 30 may further contain a migration inhibitor made of a phenolic compound. An OCA 30 containing such a migration inhibitor is more effective to prevent silver migration from occurring.

The term phenolic compound implies a compound that contains a phenolic group in molecules. Such a compound suppresses ion migration by reducing silver ions to metal silver.

The phenolic compound preferably has a redox potential within a range of 0.40 to 1.30 V. For improving the ability to prevent ion migration, the phenolic compound more preferably has a redox potential that lies within a range of 0.50 to 1.20 V, much more preferably, within a range of 0.55 to 1.1 V, and particularly preferably, within a range of 0.55 to 1.0 V. On the condition that the redox potential of the reducing compound is less than 0.40 V or greater than 1.30 V, the reducing compound exhibits a poor ability to prevent ion migration.

The redox potential can be measured by methods described in many documents. According to the present invention, a value measured by the following method is used to define the redox potential.

More specifically, a dimethylformamide (DMF) solution containing 1 mM of a reducing compound and 0.1 M of tetrabutylammonium perchlorate as a supporting electrolyte is bubbled with Ar for five minutes. Thereafter, cyclic voltammetry is performed on the solution by a potentiostat (ALS-604A, BAS Inc.). The redox potential is measured using a working electrode made of glassy carbon, a counter electrode made of Pt, and a reference electrode made of a saturated calomel electrode.

Compounds represented by the following formulas (1) through (3) may be cited as preferred specific examples of the phenolic compound.

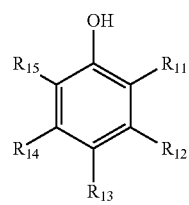

Formula (1)

Formula (2)

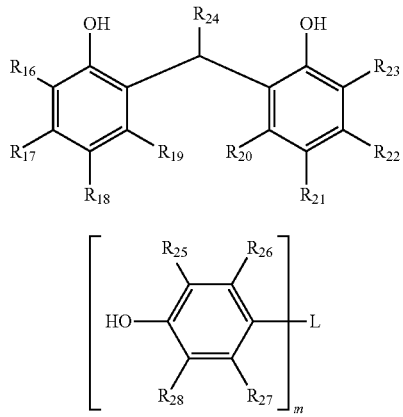

Formula (3)

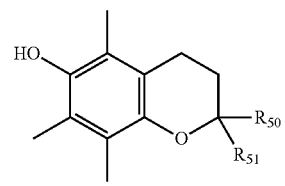

In formula (1), $R_{11}$ to $R_{15}$ individually represent a hydrogen atom, a hydroxyl group, or a hydrocarbon group having 1 to 20 carbon atoms with or without a heteroatom.

A preferred example of the hydrocarbon group is —O—$R_{31}$, for example, where $R_{31}$ represents a hydrocarbon group having 1 to 20 carbon atoms with or without a heteroatom. In a case where there are a plurality of —O—$R_{31}$ hydrocarbon groups, the groups may be identical to or different from each other.

The carbon number of the hydrocarbon group preferably lies within a range of 1 to 12, and more preferably, lies within a range of 1 to 10 for enhancing compatibility with insulating resins.

More specifically, the hydrocarbon group may be an aliphatic hydrocarbon group, an aromatic hydrocarbon group, or a group having a combination of such groups. The aliphatic hydrocarbon group may be linear, a branched-chain, or cyclic.

The total of the molecular weights of the groups $R_{11}$ to $R_{15}$ is 21 or greater, and preferably, is 35 or greater. Although the total of the molecular weights is not limited to any particular upper limit, the upper limit preferably is 1000 or less, more preferably, is 500 or less, or much more preferably, is 300 or less.

Any two of $R_{11}$ to $R_{15}$ may be combined in a ring structure. For example, two adjacent groups, such as $R_{11}$ and $R_{12}$, $R_{12}$ and $R_{13}$, $R_{13}$ and $R_{14}$, or $R_{14}$ and $R_{15}$, may be combined in a ring structure. The ring, which is formed in this manner, is not limited to any particular type, but may be a 5- or 6-membered ring, for example.

In formula (2), $R_{16}$ to $R_{23}$ individually represent a hydrogen atom, a hydroxyl group, or a hydrocarbon group having 1 to 20 carbon atoms with or without a heteroatom.

A preferred range of the hydrocarbon groups that are represented by $R_{16}$ to $R_{23}$ is the same as the preferred range of the aforementioned hydrocarbon groups that are represented by $R_{11}$ to $R_{15}$.

The total of the molecular weights of the groups $R_{16}$ to $R_{23}$ is 24 or greater, and preferably, is 35 or greater. Although the total of the molecular weights is not limited to any particular upper limit, the upper limit preferably is 1000 or less, more preferably, is 500 or less, and much more preferably, is 300 or less. Any two of the groups $R_{16}$ to $R_{23}$ may be combined in a ring structure.

$R_{24}$ represents a hydrogen atom or a hydrocarbon group having 1 to 20 carbon atoms with or without a heteroatom.

In formula (3), $R_{25}$ to $R_{28}$ individually represent a hydrogen atom, a hydroxyl group, or a hydrocarbon group having 1 to 20 carbon atoms with or without a heteroatom.

A preferred range of the hydrocarbon groups that are represented by $R_{25}$ to $R_{28}$ is the same as the preferred range of the aforementioned hydrocarbon groups that are represented by $R_{11}$ to $R_{15}$.

The total of the molecular weights of the groups $R_{25}$ to $R_{28}$ is 40 or greater, and more preferably, is 50 or greater. Although the total of the molecular weights is not limited to any particular upper limit, the upper limit thereof preferably is 1000 or less, more preferably, is 500 or less, and much more preferably, is 300 or less.

Any two of $R_{25}$ to $R_{28}$ may be combined in a ring structure.

L represents a bivalent or trivalent hydrocarbon group which may have a heteroatom, —S—, or a group based on a combination thereof. The carbon number of the bivalent hydrocarbon group preferably lies within a range of 1 to 12, and more preferably, lies within a range of 1 to 10 for enhancing compatibility with insulating resins. The variable m represents an integer of 2 or 3.

A preferred form of $R_{13}$ in formula (1) and $R_{18}$ and $R_{21}$ in formula (2) may be a group that is represented by the following formula (4) shown below.

$$*-CH_2-R_{34} \quad (4)$$

In formula (4), $R_{34}$ represents a hydrogen atom or a hydrocarbon group having a carbon number that lies within a range of 1 to 19. The carbon number of the hydrocarbon group, which is represented by formula (4), preferably lies within a range of 1 to 12, and more preferably, lies within a range of 1 to 10 for enhancing compatibility with insulating resins. In formula (4), the asterisk represents a bond position.

For improving the ability to prevent ion migration, the compound represented by the following formula (5) may be cited as a preferred example of the phenolic compound.

Formula (5)

In formula (5), $R_{50}$, $R_{51}$ individually represent a hydrogen atom, a hydroxyl group, an aliphatic hydrocarbon group with our without an oxygen atom, or an aromatic hydrocarbon group with our without an oxygen atom. For improving the ability to prevent ion migration, at least one of $R_{50}$ or $R_{51}$ preferably is an alkyl group containing tertiary or quaternary carbon atoms.

The number of carbon atoms contained within the aliphatic hydrocarbon group or the aromatic hydrocarbon group is not particularly limited, but preferably lies within a range of 1 to 20. In particular, $R_{50}$ preferably is an alkyl group in which the number of carbon atoms lies within a range of 1 to 5, and $R_{51}$ preferably is an alkyl group in which the number of carbon atoms lies within a range of 10 to 20.

The total of the molecular weights of the hydrocarbon group contained in the groups $R_{50}$, $R_{51}$ preferably is 30 or greater, and more preferably, is 50 or greater. In a case where the total number of carbon atoms falls within this range, the ability to prevent silver ion migration is increased.
The compounds indicated below may be cited as examples of the phenolic compound.
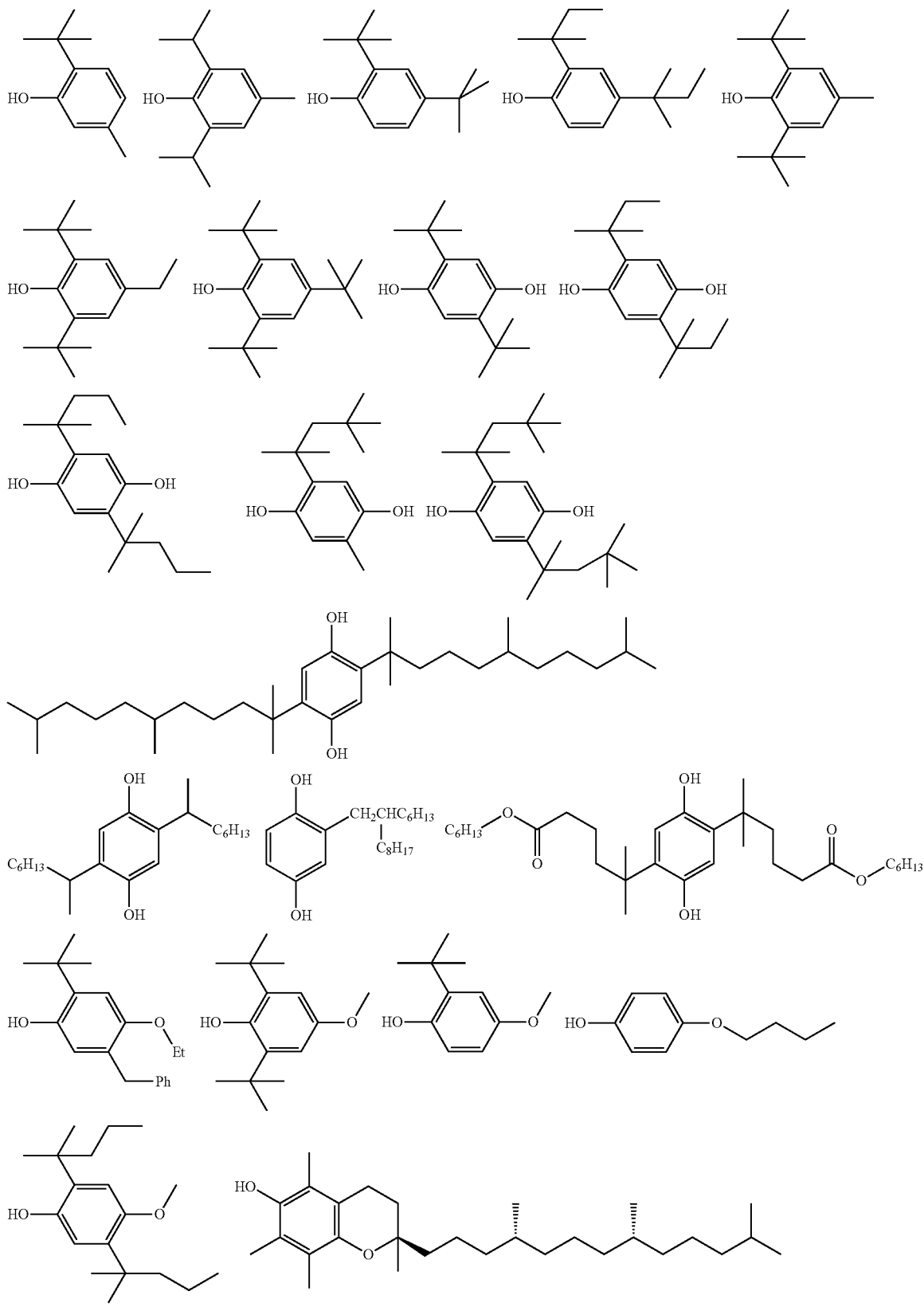

-continued
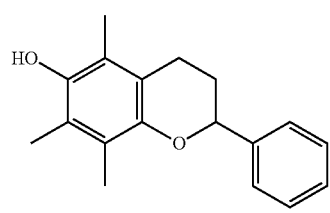 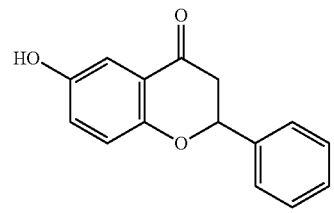 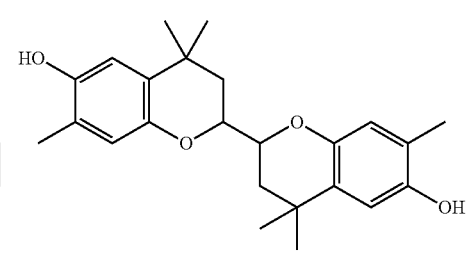
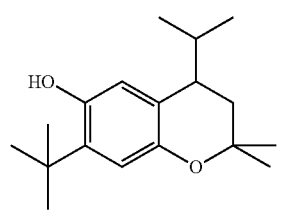 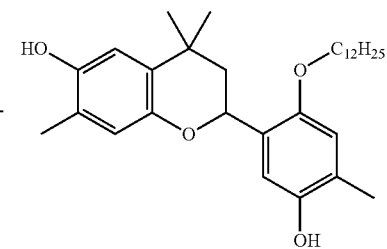 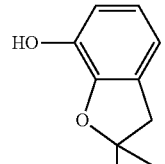
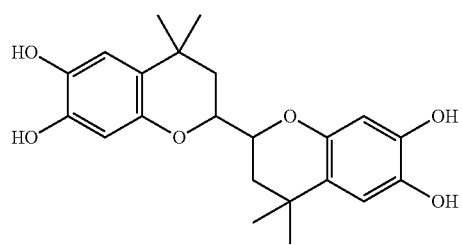 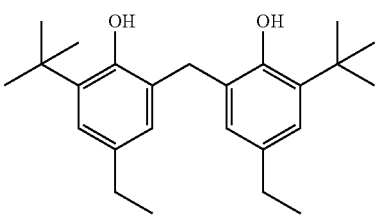
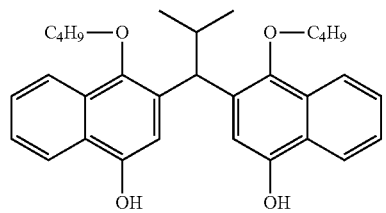 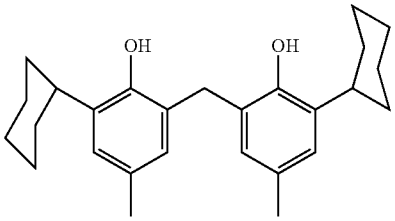 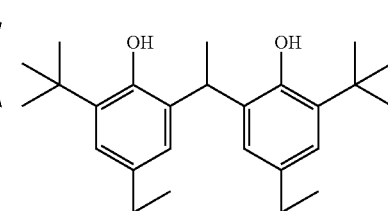
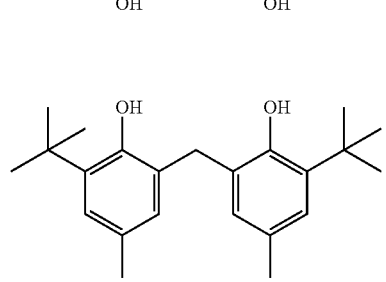 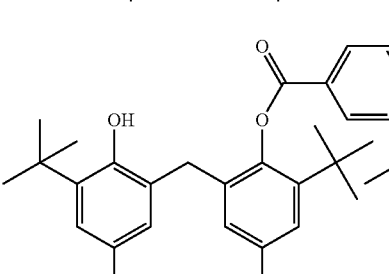 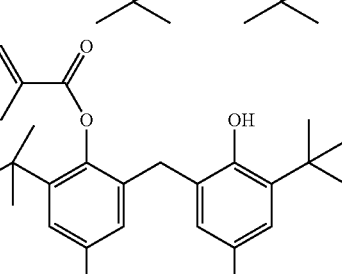
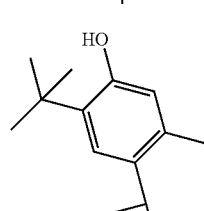 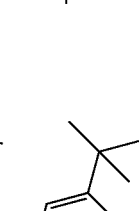 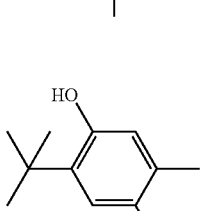 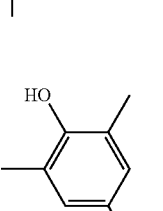 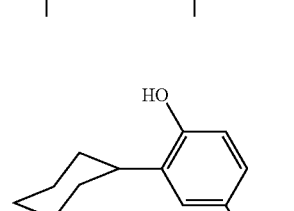
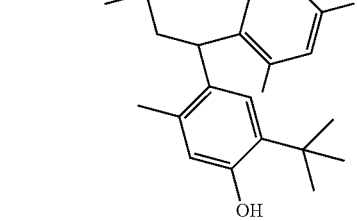 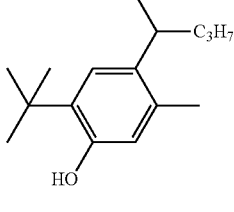 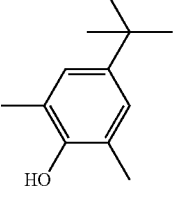 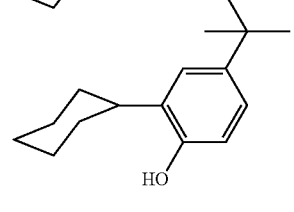

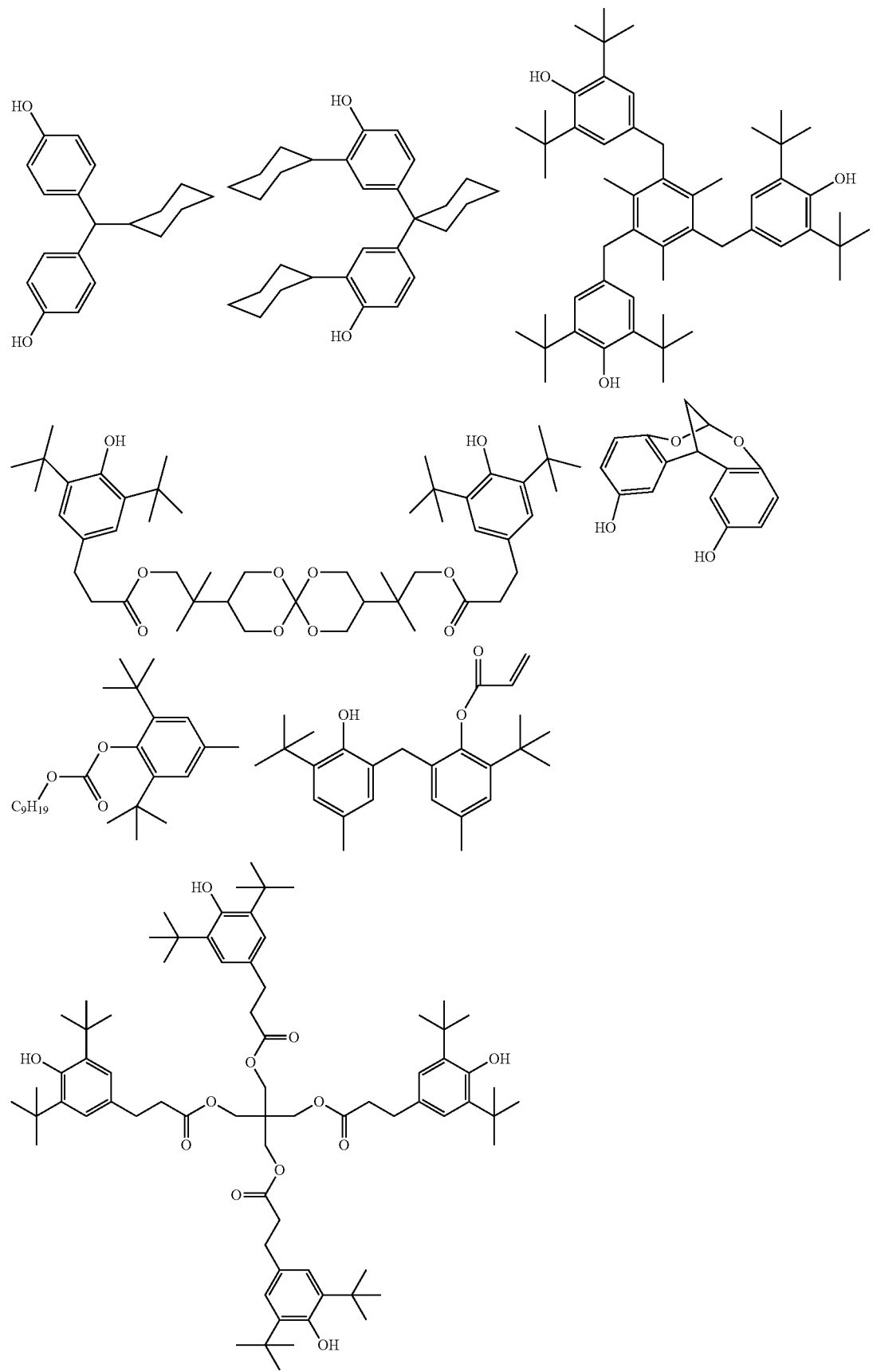

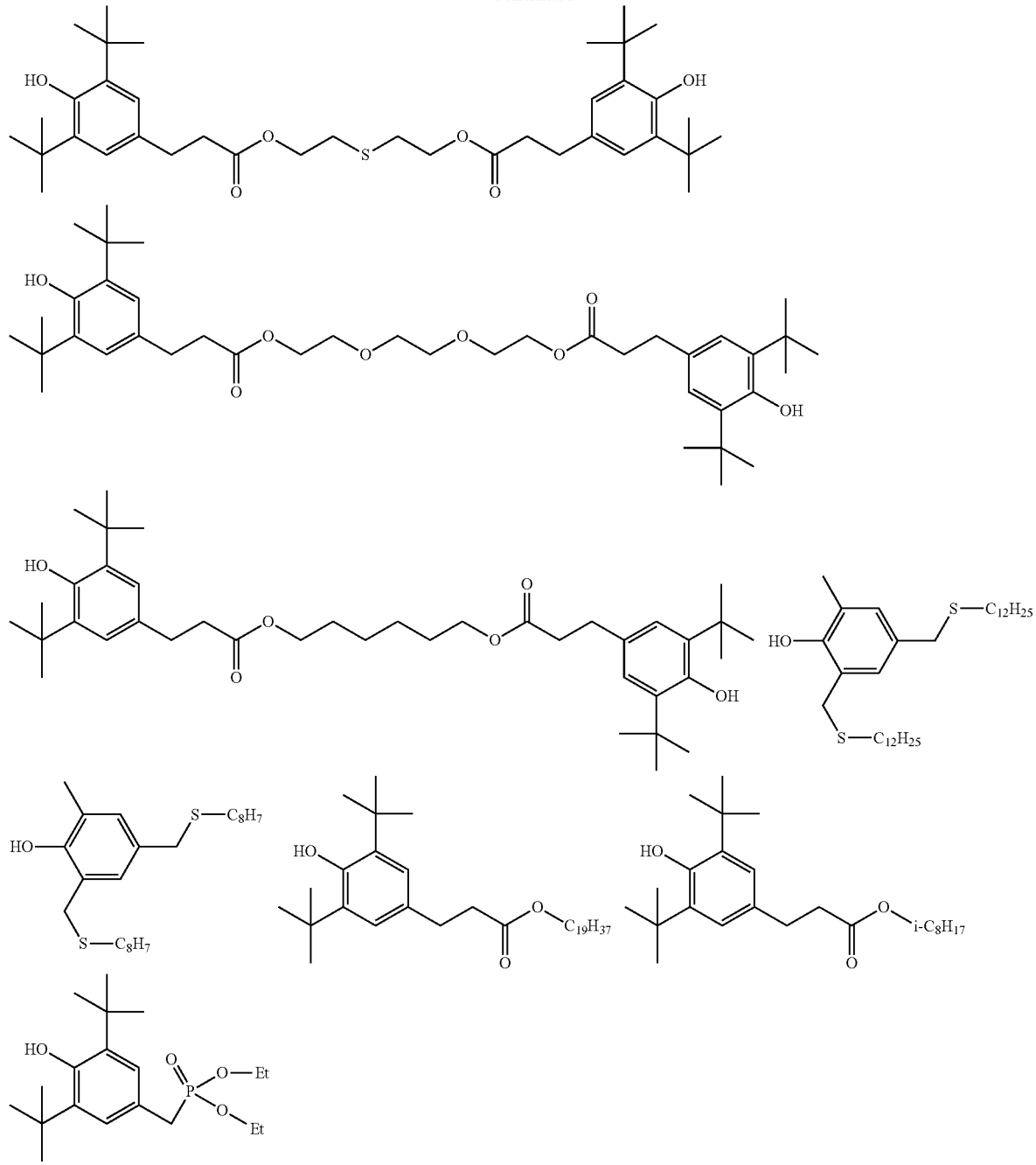

In addition to or instead of the phenolic compound, the OCA 30 may contain a heterocyclic compound having a mercapto group (—SH) (a SH-group-containing heterocyclic compound) as a migration inhibitor. The heterocyclic compound suppresses ion migration by trapping silver ions with a heteroatom contained in the mercapto group and the heterocyclic part.

The heterocyclic compound is a cyclic compound having at least one heteroatom. The term heteroatom implies an atom other than a carbon atom and a hydrogen atom. Further, the term heteroatom implies only an atom forming a part of a cyclic system of the heterocycle, and implies neither an atom that is positioned outside of the cyclic system or separated from the cyclic system by at least one unconjugated single bond, nor an atom that forms a part of a further substituted group of the cyclic system. There is no particular upper limit on the number of heteroatoms, but the number of heteroatoms preferably is 10 or less, more preferably, is 6 or less, and particularly preferably, is 4 or less.

Any SH-group-containing heterocyclic compounds that satisfy the above requirements may be used. However, the heteroatom preferably is a nitrogen atom, a sulfur atom, an oxygen atom, a selenium atom, a tellurium atom, a phosphorus atom, a silicon atom, or a boron atom, more preferably, is a nitrogen atom, a sulfur atom, or an oxygen atom, and particularly preferably, is a nitrogen atom or a sulfur atom.

The number of ring members of the heterocycle is not limited. However, the heterocycle preferably is a 4-through 10-membered ring, more preferably, is a 5- through 9-membered ring, and much more preferably, is a 5- or 6-membered ring.

The heterocycle may be either aromatic or non-aromatic, but preferably is an aromatic heterocycle.

The configuration of the heterocycle may be either a monocycle or a condensed cycle, but preferably is a heterocycle having one or two aromatic rings.

Specific examples of the heterocycle include a pyrrole ring, a thiophene ring, a furan ring, an imidazole ring, a pyrazole ring, a thiazole ring, an isothiazole ring, an oxazole ring, an isoxazole ring, a pyridine ring, a pyrazine ring, a pyrimidine ring, a pyridazine ring, an indolizine ring, a triazole ring, an oxadiazole ring, a thiadiazole ring, a triazaindene ring, a tetraazaindene ring, a pentaazaindene ring, a hexaazaindene ring, a purine ring, a tetrazole ring, a pyrazotriazole ring, a pyrrolotriazole ring, and an indole ring, a benzofuran ring, a benzothiophene ring, an isobenzofuran ring, a quinolizine ring, a quinoline ring, a phthalazine ring, a quinoxaline ring, an isoquinoline ring, a carbazole ring, a phenanthridine ring, a phenanthroline ring, an acridine ring, and a benzotriazole ring, which are benzo-condensed to the above rings, and a pyrrolidine ring, a pyrroline ring, an imidazoline ring, and the like, in which the above rings are partially or fully saturated. However, the heterocycle is not limited to the above rings.

The SH-group-containing heterocyclic compound includes a mercapto group. Such a mercapto group is highly reactive for generating a covalent bond with silver. The mercapto group is bonded to the above-described heterocycle.

The amount of the mercapto group included within the SH-group-containing heterocyclic compound is not particularly limited. However, since the dispersibility of the SH-group-containing heterocyclic compound is better in insulating resins, the ratio of the total atomic weight of the mercapto group to the entire molecular weight of the compound preferably is 50% or less, and more preferably, is 40% or less.

A plurality of mercapto groups may be included, and not just a single mercapto group.

The SH-group-containing heterocyclic compound may have a substituted group other than a mercapto group. For example, the substituted group may be a halogen atom, an alkyl group, an alkenyl group, an alkynyl group, an aryl group, a cyano group, a hydroxyl group, a nitro group, a carboxyl group, an alkoxy group, an aryloxy group, a syliloxy group, an acyloxy group, a carbamoyloxy group, an alkoxycarbonyloxy group, an aryloxycarbonyloxy group, an amino group, an ammonio group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imide group, a phosphino group, a phosphinyl group, a phosphinyloxy group, a phosphinylamino group, a phosphono group, a silyl group, a hydrazino group, a ureido group, a boronate group (—B(OH)$_2$), a phosphato group (—OPO(OH)$_2$), a sulphato group (—OSO$_3$H), or the like.

Assessment values (indexes) for assessing the features of patterns according to the present invention will be described below. Image quality is assessed primarily according to whether or not the visibility of moire phenomena and color noise is good. Assessment values (indexes) primarily include a second assessment value, which is suitable for assessing the visibility of moire phenomena, a first assessment value, which is suitable for assessing the visibility of color noise, and a third assessment value, which is suitable for assessing moire phenomena and color noise (frequency component) substantially equivalently. Either of the first assessment value, the second assessment value, and the third assessment value may be used, depending on the image quality that is assessed. More specifically, either one or both of visibility of moire phenomena and visibility of color noise may be used. These assessment values are not limited to being used in isolation, but two or more of such assessment values may be used in combination, depending on the objects and targets that are subject to assessment.

[First Assessment Value]

Initially, the first assessment value will be described below.

The first assessment value (area distribution) is an assessment value corresponding to the standard deviation of the area of a plurality of cells, in which greater importance is placed on color noise intensity than on moire phenomena. Such an assessment value serves as an index that is effective to determine that color noise is good for image quality assessment, although the assessment value also is capable of being used to assess moire phenomena.

The first assessment value EV1 is an index representing a quantified variation of the area distribution of the cells 22A, 22B (or mesh shape). The first assessment value EV1 will be described below with reference to FIGS. 5A through 7D.

Figure 5A:
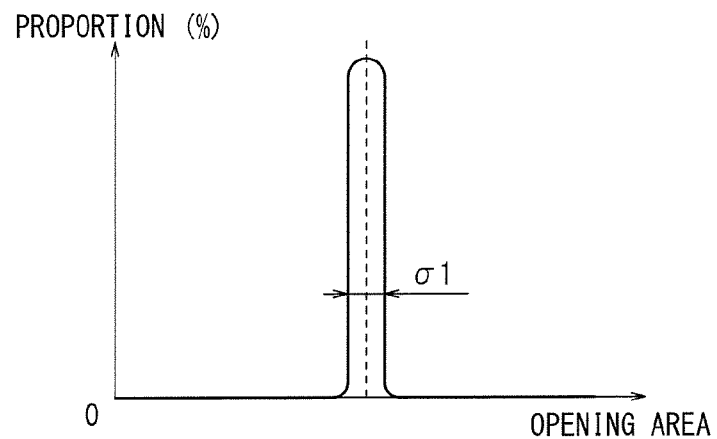
FIGS. 5A through 5C are histograms of areas defined by openings in a mesh pattern.
Figure 5B:
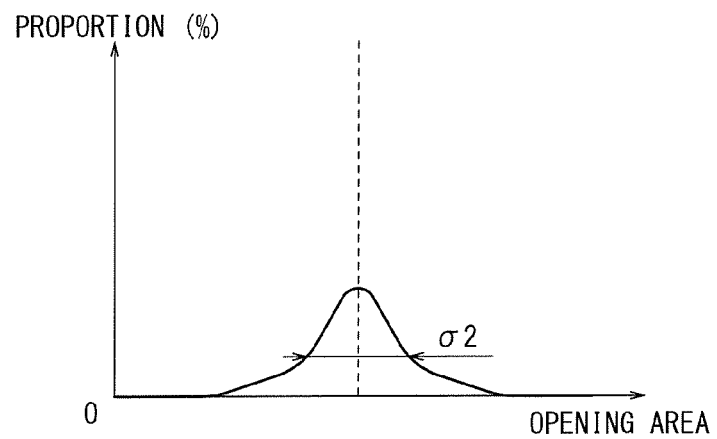
Figure 5C:
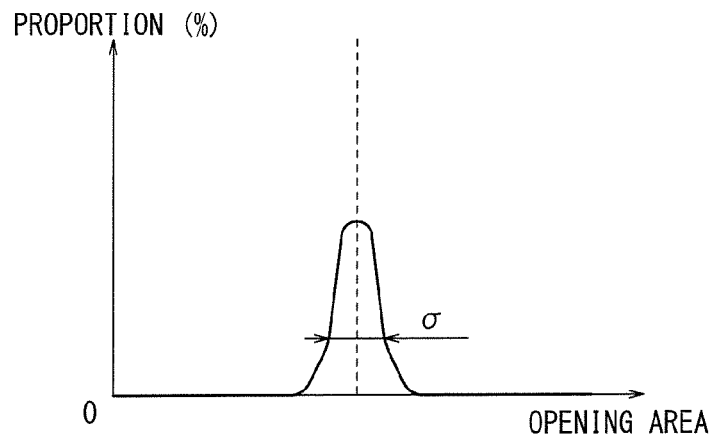

FIGS. 5A through 5C are histograms of areas (hereinafter also referred to as "opening areas") possessed by the cells 22A, 22B in a mesh pattern.

FIG. 5A shows a typical histogram of opening areas in a mesh pattern, in which the regularity of the layout shapes of the fine silver lines 20 is high. The histogram is a Gaussian distribution having a standard deviation σ1 with an average value Save. In the case that the regularity of the interconnected shapes of the fine silver lines 20 is high, the opening areas of the cells 22A, 22B have a tendency to be distributed uniformly. If the value of the standard deviation σ1 is small, the touch panel 100 tends to produce moire phenomena in a positional relationship in which the touch panel 100 is superposed on the display device 108 (see FIG. 1).

FIG. 5B shows a typical histogram of opening areas in a mesh pattern, in which the regularity of the layout shapes of the fine silver lines 20 is low. The histogram is a Gaussian distribution having a standard deviation σ2 with an average value Save. In the case that the regularity of the interconnected shapes of the fine silver lines 20 is low, the opening areas of the cells 22A, 22B have a tendency to be distributed widely. If the value of the standard deviation σ2 is large, an observer is likely to visually recognize granular noise (graininess). Furthermore, since the ratio at which a red subpixel, a green subpixel, and a blue subpixel, which jointly make up each pixel, exist differs for each of the cells 22A, 22B, the subpixels tend to become visibly conspicuous as color noise.

FIG. 5C shows a typical histogram of opening areas in a mesh pattern, in which the layout shapes of the fine silver lines 20 are determined appropriately. The histogram includes a Gaussian distribution having a standard deviation σ with an average value S$_{ave}$. If the standard deviation σ is determined to fall within a range of σ1<σ<σ2, moire phenomena, granular noise, and color noise are suppressed altogether.

The first assessment value EV1, which characterizes the distribution of the areas of the cells 22A, 22B, is calculated according to the following equation (b), using the area Sk (k=1, 2, . . . , N) of each of the cells 22A, 22B.

$$EV1 = \sqrt{\frac{\sum_{k=1}^{N}(S_k - S_{ave})^2}{N-1}} \quad (b)$$

As can be understood from the above equation (b), the first assessment value EV1 corresponds to the standard deviations σ1, σ2, σ (see FIGS. 5A through 5C). The first assessment value EV1 assumes a value of 0 or greater at all times, and preferably lies within a predetermined range (σ1<EV1<σ2), in view of the generation of moire phenomena, granular noise, and color noise from a comprehensive standpoint.

According to the present invention, the first assessment value EV1 must be in a range from 110.2 pixels (0.017 mm$^2$) to 240 pixels (0.038 mm$^2$) in terms of converted 2032 dpi, as made clear from the Inventive Examples, which will be described later. The first assessment value EV1 preferably lies within a range from 120 pixels (0.019 mm$^2$) to 170 pixels (0.027 mm$^2$).

The following reasons may be cited as reasons why the first assessment value EV1 is limited to the range from 110.2 pixels (0.017 mm$^2$) to 240 pixels (0.038 mm$^2$). If the first assessment value EV1 is less than 110.2 pixels (0.017 mm$^2$), not only color noise but also moire phenomena become visible. If the first assessment value EV1 is in excess of 240 pixels (0.038 mm$^2$), then since the areas vary greatly, stress migration is likely to occur as well as an excessive variation in color noise, thus posing a disadvantage in terms of visibility, and making color noise irregular and highly visible.

In the case of a mesh pattern filled with polygonal shapes, as in the example shown in FIG. 4, since the respective shapes of the cells 22A, 22B (or the respective mesh shapes) are defined uniquely, it is easy to calculate the opening areas and the first assessment value EV1. However, in a case where the mesh shapes are modified, the opening areas of the cells 22A, 22B may not be defined uniquely. In the scope of the appended claims and in the description of the present application, in order to clarify the definition of the first assessment value EV1, the opening area is defined in the following manner.

FIGS. 6A through 6D are schematic views of examples (first through third examples) in which other elements are added to the regions of the topologically closed cells 22a. In such examples, an element (line element), which forms a closed region, is extracted in advance, elements apart from the extracted element are excluded, and the opening area of the cell 22a is calculated.

Figure 6A:
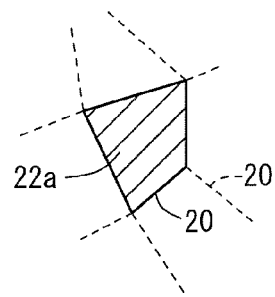
FIGS. 6A through 6D are schematic views of examples (first through third examples) in which other elements are added to regions of openings that are topologically closed.

As shown in FIG. 6A, the opening area of the topologically closed cell 22a is calculated as the area of the region shown in hatching. Since the cell 22a has a geometrically perfect quadrangular shape, the opening area thereof is calculated uniquely.

Figure 6B:
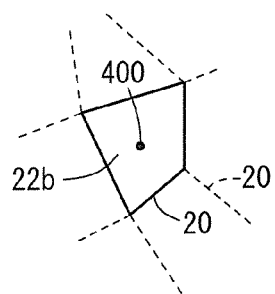

According to the first example, as shown in FIG. 6B, a cell 22b in which a point element 400 is placed in a portion (e.g., the center) of the cell 22a shown in FIG. 6A will be considered. The opening area of the cell 22b is calculated as the area of the region except for the point element 400. In other words, the cell 22b is handled in the same manner as the cell 22a (see FIG. 6A).

Figure 6C:
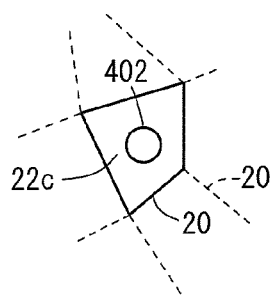

According to the second example, as shown in FIG. 6C, a cell 22c in which an annular line element 402 is placed in a portion of the cell 22a shown in FIG. 6A will be considered. The opening area of the cell 22c is calculated as the area of the region except for the annular line element 402. In other words, the cell 22c is handled in the same manner as the cell 22a (see FIG. 6A).

Figure 6D:
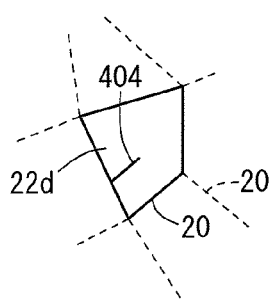

According to the third example, as shown in FIG. 6D, a cell 22d having a line element 404 (a so-called whisker) that crosses a boundary (one side of a quadrangular shape in FIG. 6D) of the cell 22a shown in FIG. 6A, and which projects inside the cell 22a, will be considered. The opening area of the cell 22d is calculated as the area of the region except for the line element 404. In other words, the cell 22d is handled in the same manner as the cell 22a (see FIG. 6A).

FIGS. 7A through 7D are schematic views of examples (fourth through sixth examples) in which openings thereof are topologically open and do not represent a mesh shape. In such examples, a shortest imaginary line is added to the lines surrounding the cells 22A, 22B in order to define a closed region (hereinafter referred to as a "tentative region"), and the area of the tentative region is calculated as the opening areas of the cells 22A, 22B.

However, the calculation of the opening area is defined such that it is possible to calculate the opening area only in a case where the sum of the lengths of the added imaginary lines is equal to or less than 20% of the total length of the boundary lines that define the tentative region. This is because, on the condition that the sum of the lengths of the added imaginary lines exceeds 20% of the total length of the boundary lines that define the tentative region, it becomes impossible to specify the cells 22A, 22B.

Figure 7A:
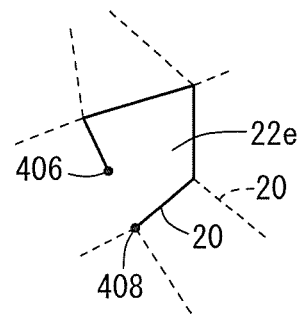
FIGS. 7A through 7D are schematic views of examples (fourth through sixth examples) in which openings thereof are topologically open and do not represent a mesh shape.
Figure 7B:
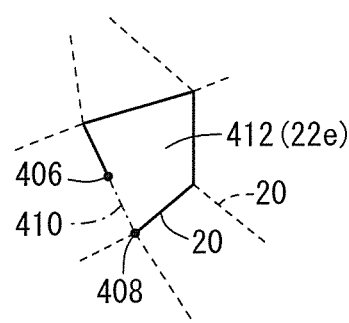

According to the fourth example, as shown in FIG. 7A, the lines that surround a cell 22e have a shape that lacks part of the boundary lines of the cell 22a (see FIG. 6A). As shown in FIG. 7B, a tentative region 412 having the same shape as the cell 22a (see FIG. 6A) is defined by adding a shortest path (i.e., a straight imaginary line 410) between a first endpoint 406 and a second endpoint 408. The opening area of the cell 22e is calculated as the area of the tentative region 412. In other words, the cell 22e is handled in the same manner as the cell 22a.

Figure 7C:
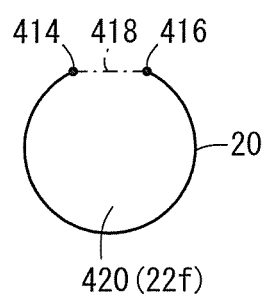

According to the fifth example, as shown in FIG. 7C, a line surrounding a cell 22f is of an arcuate shape that lacks part of the circumference. A tentative region 420 is defined by adding a shortest path (i.e., a straight imaginary line 418) between a first endpoint 414 and a second endpoint 416. The opening area of the cell 22f is calculated as the area of the tentative region 420.

Figure 7D:
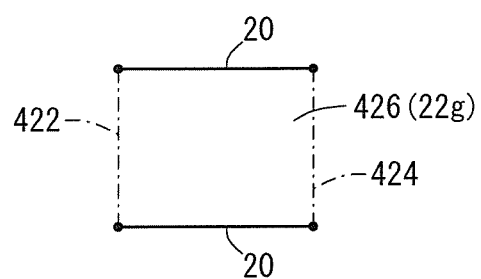

According to the sixth example, as shown in FIG. 7D, a cell 22g is defined by an open area that is sandwiched between a pair of parallel lines. A rectangular tentative region 426 is defined by adding hypothetical lines 422, 424 interconnecting the endpoints of the parallel lines. However, since the sum of the lengths of the added hypothetical lines 422, 424 exceeds 20% of the total length of the boundary lines that define the tentative region 426, it is not possible to calculate the opening area. Hence, the sixth example is excluded from the calculation of the first assessment value EV1.

[Second Assessment Value]

The second assessment value will be described below.

The second assessment value is an assessment value in which greater importance is placed on moire phenomena intensity than on color noise. Such an assessment value is an index effective to determine that moire phenomena is good (difficult to be recognized visually) for image quality assessment, although the second assessment value also is capable of being used to assess color noise.

The second assessment value EV2 is an index representing a quantified variation of a spatial frequency characteristic of the interconnected shapes of the fine silver lines 20. The second assessment value EV2 will be descried below with reference to FIGS. 8A through 9B.

Figure 8A:
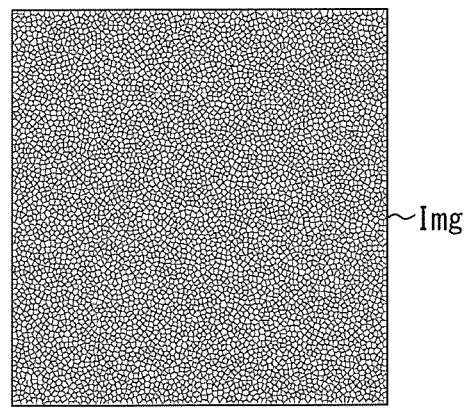
FIG. 8A is a schematic view showing a visualized form of image data representative of a mesh pattern.

FIG. 8A is a schematic view showing a visualized form of image data Img representative of a mesh pattern. First, the image data Img are subjected to Fourier transformation (for example, FFT; Fast Fourier Transformation). At this time, the shape of the mesh pattern in the form of a spatial frequency distribution can be grasped.

Figure 8B:
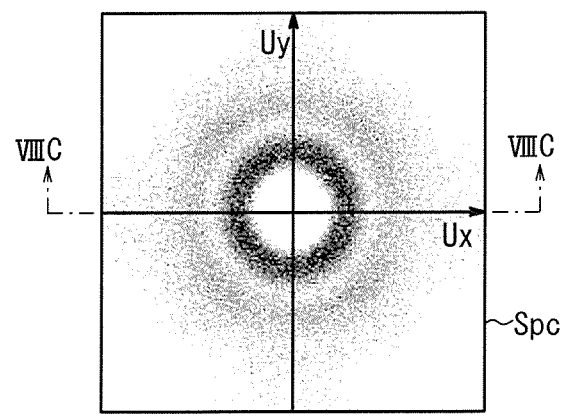
FIG. 8B is a diagram showing a power spectrum distribution obtained by performing Fourier transformation on the image data shown in FIG. 8A.

FIG. 8B is a diagram showing a two-dimensional power spectrum distribution (hereinafter referred to simply as a "spectrum Spc"), which is obtained by performing FFT on the image data Img shown in FIG. 8A. The diagram has a horizontal axis representing spatial frequencies (Ux) along an X-axis direction, and a vertical axis representing spatial frequencies (Uy) along a Y-axis direction. The lower the display density of the spatial frequency bands becomes, the smaller the intensity level (spectral value) is, and conversely, the higher the display density of the spatial frequency bands becomes, the greater the intensity level (spectral value) is. In the example shown in FIG. 8B, the spectrum Spc is an isotropic distribution having two annular peaks.

A spectral intensity distribution function $SPC(r, \theta)$ (hereinafter also referred to as a "radial spectrum") of the spectrum Spc is calculated, which is represented in polar coordinates, and in which the radial spatial frequency $r=(Ux^2+Uy^2)^{1/2}$ corresponding to the distance from the origin O, and the deflection angle $\theta=\tan^{-1}(Uy/Ux)$ are variables. In addition, an amount of statistical variation of such functions is calculated.

Figure 8C:
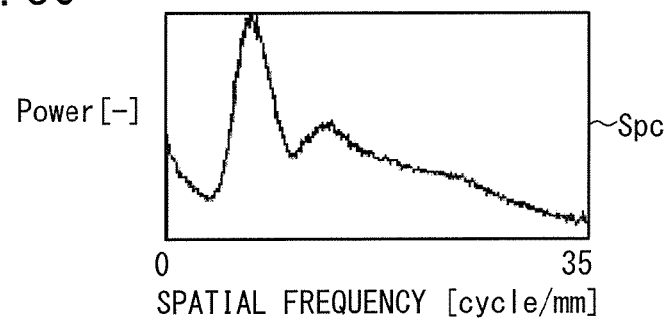
FIG. 8C is a cross-sectional view taken along the origin line VIIIC-VIIIC of the power spectrum distribution shown in FIG. 8B.

FIG. 8C shows a spectral intensity (Power: spectral value) along the origin line VIIIC-VIIIC of the power spectrum distribution shown in FIG. 8B, thereby illustrating a spectral intensity distribution function $SPC(r, 0)$ at a time that the deflection angle $\theta$ is 0 degrees ($\theta=0$).

Figure 9A:
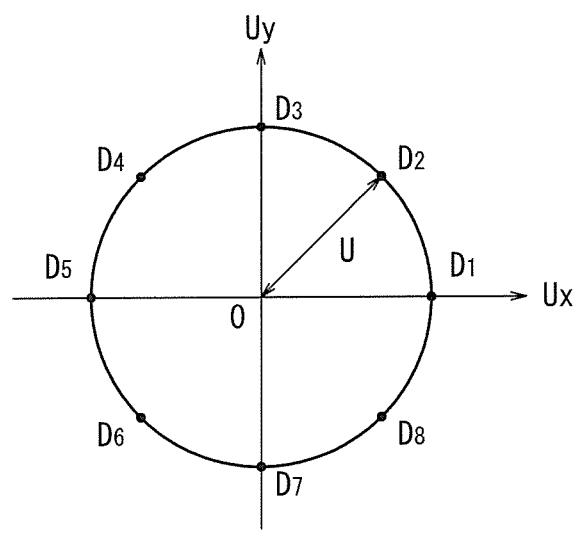
FIG. 9A is a diagram representing a process of calculating an amount of deviation of the power spectrum along a moving radius.

In the example shown in FIG. 9A, while the radial spatial frequency (r) is a constant value and the deflection angle ($\theta$) varies within a range of 0 to 360 degrees, the variance of the radial spectrum $SPC(r, \theta)$ at the respective deflection angles is calculated, and a value obtained when the calculated variance is divided by the square of the radial spectrum $SPC(r, \theta)$ is defined as an anisotropy $AI(r)$. A standard deviation, in which a common logarithm whose horizontal axis represents the radial spatial frequency (r) and whose vertical axis represents the anisotropy $AI(r)$, is used. The standard deviation is defined as a second assessment value (amount of deviation) EV2, which is expressed by the following equations (c) cited below.

As indicated by the following equations (c), a standard deviation along an angular direction (deflection angle $\theta=0$ to 360 degrees) in the power spectrum Spc of the mesh pattern is indicated by the anisotropy $AI(r)$ in which the radial spatial frequency is denoted by r and the deflection angle is denoted by $\theta$, and the standard deviation of the anisotropy $AI(r)$ along a radial direction of the value represented by the normal logarithm is indicated by an amount EV2 of deviation, which serves as the second assessment value. The number n of samples of the spectrum Spc for calculating power (spectral intensity) is represented in polar coordinates by the number of pixels on a particular radial spatial frequency (circumference of $r=r_0$).

Figure 9B:
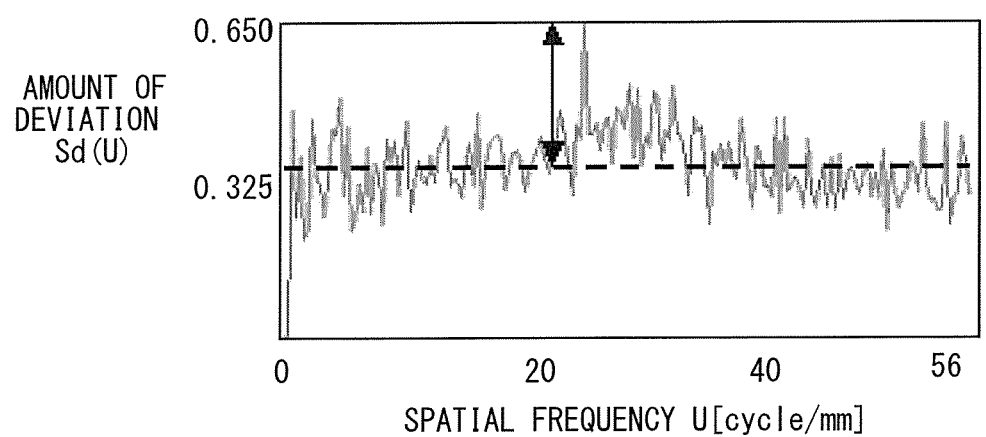
FIG. 9B is a graph showing characteristics of the amount of deviation with respect to spatial frequencies.

FIG. 9B is a graph of the anisotropy $AI(r)$ with respect to the radial spatial frequencies r. In the example shown in FIG. 9B, a sharp peak exists in a spatial frequency band in the vicinity of about 22 cycles/mm. In other spatial frequency bands, the anisotropy $AI(r)$ is of a generally flat characteristic.

$$EV2 = \frac{\max\{Sd(U)\}}{ave\{Sd(U)\}} \Rightarrow \quad (c)$$

$$AI(r) = \frac{1}{n-1} \sum_{\theta=0}^{2\pi} \frac{\{SPC_{ave}(r) - SPC(r, \theta)\}^2}{\{SPC(r, \theta)\}^2}$$

$$EV2 = \sqrt{\frac{\sum_{r=1}^{nyq} (\log_{10} AI_{ave} - \log_{10} AI(r))^2}{m-1}}$$

n: number of samples
r: radial frequency
$\theta$: deflection angle

In the above equations (c), $AI(r)$ represents the anisotropy of the radial spectrum at the radial spatial frequency r, $SPC(r, \theta)$ represents the radial spectrum (spectral intensity distribution function) of the spectrum Spc, $SPC_{ave}(r)$ represents the average value of the spectrum Spc along the angular direction (at a deflection angle $\theta=0$ to 360 degrees) of the radial spectrum SPC, n represents the number of samples of the radial spectrum SPC along the angular direction (at a deflection angle $\theta=0$ to 360 degrees), $AI_{ave}$ represents the average value of the anisotropy AI along the radial direction (at the radial spatial frequency $r=0$ to nyq (Nyquist frequency), and m represents the number of samples of the anisotropy AI along the radial direction (at the radial spatial frequency $r=0$ to nyq (Nyquist frequency). In the above equations (c), the summation $\Sigma$ at a deflection angle of $\theta=0$ to $2\pi$ represents a summation $\Sigma$ at j=1 to n for $\theta=(2\pi/n)$, and the summation $\Sigma$ at the radial spatial frequency of $r=0$ to nyq represents a summation $\Sigma$ at k=1 to m for $r=(nyq/m)k$.

The term nyq represents the Nyquist frequency with respect to the image data Img. A natural number k (k=1, 2, ..., m) corresponds to a variable that is plotted at equal intervals from a zero frequency to the Nyquist frequency. Thus, the second assessment value EV2 represents a standard deviation of the anisotropy $AI(r)$ along the radial direction.

If the values of the spectrum Spc along respective angular directions in a two-dimensional frequency space vary, the second assessment value EV2 indicates that the anisotropy of the mesh pattern is increased. In this case, since the anisotropy $AI(r)$ has a large peak at a certain spatial frequency U, the second assessment value EV2 indicated by the above equations (c) increases.

If the values of the spectrum Spc along the angular directions are uniform, as shown in FIG. 8B, then the anisotropy of the mesh pattern is lowered. In this case, the value of the anisotropy $AI(r)$ is reduced regardless of the radial spatial frequency r. In addition, the second assessment value EV2 indicated by the above equations (c) decreases.

In other words, the second assessment value EV2 represents a variation in the radial direction of the anisotropy $AI(r)$, which in turn represents a variation in the angular direction of the power spectrum Spc of the mesh pattern.

According to the present invention, the second assessment value EV2 preferably is in a range from 0.965 to 1.065. If the second assessment value EV2 is less than 0.965, the variation of the anisotropy AI becomes small and there are many particular frequency components, tending to make moire phenomena more visible. On the other hand, if the second assessment value EV2 exceeds 1.065, the variation of the anisotropy AI becomes large and several various frequency components exist together, making not only moire phenomena but also color noise components visible as irregularities. More preferably, the second assessment value EV2 is in a range from 0.97 to 1.06.

[Third Assessment Value]

The third assessment value will be described below.

The third assessment value is suitable for assessing moire phenomena and color noise (frequency components) in an essentially equivalent manner, and serves as an index effective to determine that both moire phenomena and color noise are good.

The third assessment value EV3 is an assessment value representing a quantified variation of the centers of gravity of the cells 22A. The third assessment value EV3 will be described below with reference to FIGS. 10 through 13.

Figure 10:
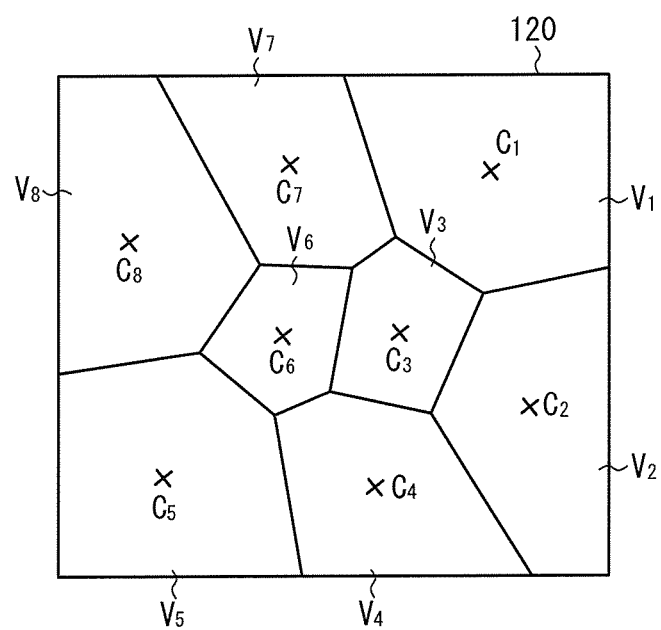
FIG. 10 is a view showing centers of gravity of respective cells.

As shown in FIG. 10, it is assumed that polygonal regions $V_1$ through $V_8$ are defined inside of a planar region 120, similar to the regions shown in FIG. 6B, which are produced using a Voronoi diagram. Points $C_1$ through $C_8$, which belong respectively to the regions $V_1$ through $V_8$, represent geometric centers of gravities of such regions.

Figure 11:
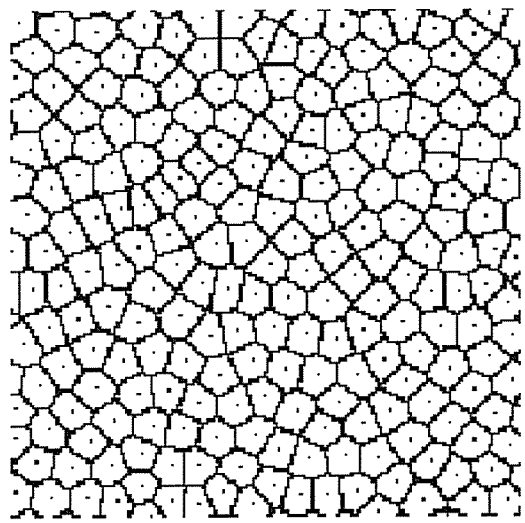
FIG. 11 is a schematic diagram showing a relationship between the mesh pattern and centers of gravity of the mesh shapes.

FIG. 11 is a schematic diagram showing a relationship between the mesh pattern according to the present embodiment and centers of gravity of the cells 22A.

Figure 12A:
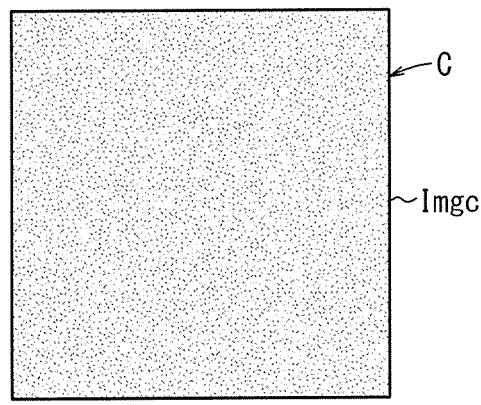
FIG. 12A is a schematic view showing a visualized form of image data, which represent a center of gravity distribution of the mesh shapes of the mesh pattern shown in FIG. 11.

FIG. 12A is a schematic view showing a visualized form of image data (hereafter referred to as "center-of-gravity image data Imgc"), which represent a distribution (hereinafter referred to as a "center-of-gravity distribution C") of the centers of gravity of the cells 22A of the mesh pattern shown in FIG. 11. As can be understood from FIG. 12A, the center-of-gravity distribution C indicates that the centers of gravity are appropriately dispersed in a non-overlapping manner.

Figure 12B:
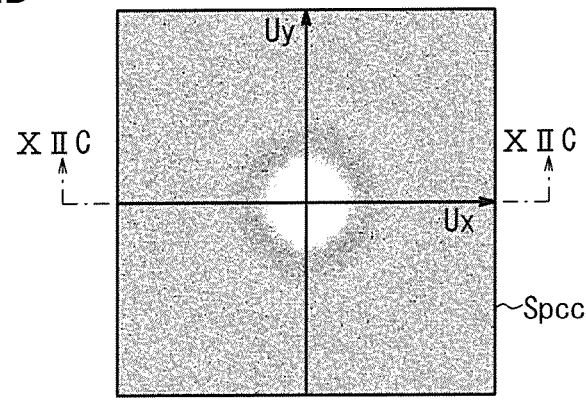
FIG. 12B is a diagram showing a power spectrum distribution obtained by performing Fourier transformation on the image data shown in FIG. 12A.

FIG. 12B is a diagram showing a two-dimensional power spectrum (hereinafter referred to as a "center-of-gravity spectrum Spcc") obtained by performing FFT on the center-of-gravity image data Imgc shown in FIG. 12A. The distribution diagram has a horizontal axis, which represents spatial frequencies (Ux) along an X-axis direction, and a vertical axis, which represents spatial frequencies (Uy) along a Y-axis direction. The lower the display density of the spatial frequency bands becomes, the smaller the intensity level (spectral value) is. Further, the higher the display density of the spatial frequency bands becomes, the greater the intensity level (spectral value) is. In the example shown in FIG. 12B, the center-of-gravity spectrum Spcc is of an isotropic distribution and has a single annular peak.

Figure 12C:
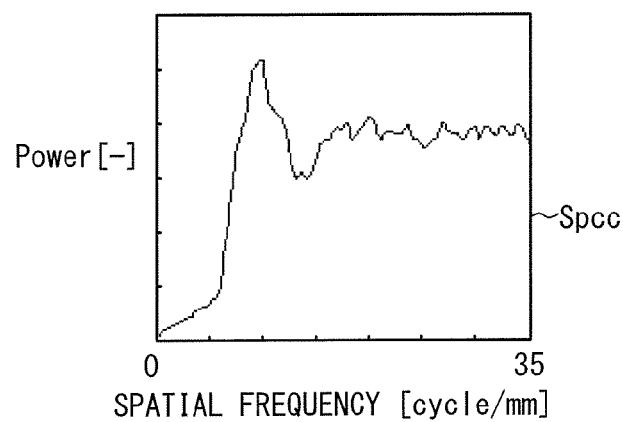
FIG. 12C is a cross-sectional view taken along the origin line XIIC-XIIC of the power spectrum distribution shown in FIG. 12B.

FIG. 12C is a cross-sectional view taken along the origin line XIIC-XIIC of the center-of-gravity spectrum distribution shown in FIG. 12B. Since the center-of-gravity spectrum Spcc is isotropic, FIG. 12C represents a radial direction distribution along every respective angular direction. As can be seen from FIG. 12C, the center-of-gravity spectrum distribution has a low intensity level in a low spatial frequency band, and has a wide peak in an intermediate spatial frequency band. Furthermore, the center-of-gravity spectrum distribution has so-called high-pass characteristics in which the intensity level becomes higher in the high spatial frequency band than in the low spatial frequency band. In other words, the center-of-gravity image data Imgc, which are shown in FIG. 12A, represent a pattern indicative of "blue noise" characteristics according to image engineering terminology.

In order to determine the center-of-gravity distribution C on the electroconductive sheets 10A, 10B, it is necessary to define the regions of the cells 22A, 22B. Such regions are defined according to the same definition that was used in calculating the first assessment value EV1 (see FIGS. 6A through 7D).

Figure 13A:
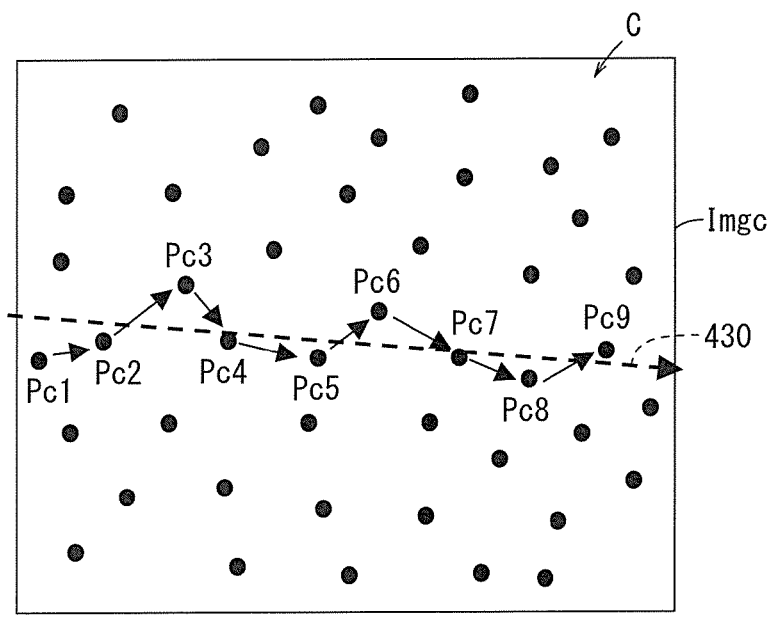
FIGS. 13A and 13B are views illustrating a process of calculating a standard deviation of centers of gravity, which are disposed along a predetermined direction, with respect to a direction perpendicular to the predetermined direction.
Figure 13B:
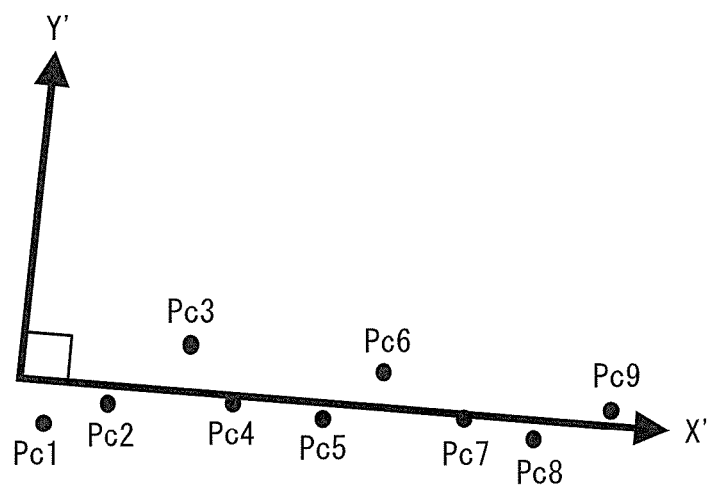

FIGS. 13A and 13B are views illustrating a process of calculating a standard deviation of centers of gravity, which are disposed along a predetermined direction, with respect to a direction perpendicular to the predetermined direction.

As shown in FIG. 13A, a center of gravity Pc1 is selected as an initial position from the center-of-gravity distribution C. Then, a center of gravity Pc2, which is closest to the center of gravity Pc1, is selected. A center of gravity Pc3, which is closest to the center of gravity Pc2, is selected from within the remaining center-of-gravity distribution C, except for the center of gravity Pc1 that has already been selected. Thereafter, N centers of gravity, which are statistically sufficient enough (in FIG. 13A, nine centers of gravity Pc1 through Pc9), are similarly selected. Thereafter, a regression line of the centers of gravity Pc1 through Pc9 is determined and defined as a reference axis 430. The regression line may be determined according to any of various known analytical processes, including a least-square method.

As shown in FIG. 13B, a reference axis (indicated as an X'-axis in FIG. 13B) and a crossing axis (indicated as a Y'-axis in FIG. 13B) perpendicular thereto are established. A standard deviation of the centers Pc1 through of gravity Pc9, which are placed along the X'-axis direction (predetermined direction) with respect to a Y'-axis direction (perpendicular direction), is calculated.

Then, an attempt is repeated M times to randomly select a center of gravity Pc1 (initial position) from within the center-of-gravity distribution C and calculate a standard deviation. The value of the standard deviation obtained in the mth (m=1, 2, ..., M) attempt is represented by STD(m). The standard deviation STD(m) is calculated by the following equation (d).

$$STD(m) = \sqrt{\frac{\sum_{k=1}^{N} (Y'_{mk} - Y'_{ave})^2}{N-1}} \quad (d)$$

In the above equation, N indicates the number of samples.

Y'mk represents the Y' coordinate of the kth center Pck of gravity in an X'Y' coordinate system in the mth attempt, $Y'_{ave}$ represents the average value of the Y' coordinates of the centers Pck of gravity in the mth attempt, and N represents the number of samples. As can be understood from the above equation (d), the standard deviation STD(m) assumes a value of 0 or greater at all times, and the noise characteristic becomes better as the standard deviation STD(m) is closer to 0.

The third assessment value EV3 is calculated according to the following equation (e), using the standard deviation STD(m) obtained in each attempt, and the average value $STD_{ave}$ of the standard deviations.

$$EV3 = \sqrt{\frac{\sum_{m=1}^{M}(STD(m) - STD_{ave})^2}{M-1}} \quad (e)$$

In the above equation (e), M indicates the number of samples.

As can be understood from the above equation (e), the third assessment value EV3 assumes a value of 0 or greater at all times, and the regularity of the center-of-gravity distribution C becomes higher as the third assessment value EV3 is closer to 0. On the condition that the center-of-gravity distribution C is regular (e.g., periodic), the value of the standard deviation STD is essentially constant regardless of the selected initial position Pc1. As a result, any variation of STD(m) in each attempt is reduced, which makes the value of the third assessment value EV3 smaller. Since the regularity of the center-of-gravity distribution C is high, the layout positions of the cells 22A, 22B and the layout positions of the pixels (red subpixels, green subpixels, and blue subpixels) come into synchronism (i.e., interfere) with each other, tending to make moire phenomena as well as granular noise and color noise more visible.

On the other hand, in the event that the cells have an appropriately dispersed center-of-gravity distribution C. as shown in FIG. 12A, the value of the standard deviation varies depending on the selected initial position Pc1. As a result, the value of STD(m) in each attempt varies, thus making the value of the third assessment value EV3 greater. Since the regularity of the center-of-gravity distribution C is low, the layout positions of the cells 22A, 22B and the layout positions of the pixels (red subpixels, green subpixels, and blue subpixels) do not come into synchronism (i.e., interfere) with each other, thereby suppressing moire phenomena and color noise.

According to the present invention, as made clear from the Inventive Examples, which will be described later, the third assessment value EV3 must be equal to or greater than 1.2 pixels (15.0 μm) in terms of converted 2032 dpi. The third assessment value EV3 preferably is equal to or greater than 4.37 pixels (54.62 μm).

According to the present invention, the reason why the third assessment value EV3 is limited to a value that is equal to or greater than 1.2 pixels (15.0 μm) is explained by the fact that, if the third assessment value EV3 is less than 1.2 pixels (15.0 μm), the regularity of the center-of-gravity distribution is high. Thus, the layout positions of the cells 22A, 22B and the layout positions of the pixels come into synchronism (i.e., interfere) with each other, tending to intensify moire components and make moire phenomena more visible. In addition, granular noise and color noise are made more visible.

According to the present invention, an upper limit value for the third assessment value EV3 is not particularly limited, but preferably is equal to or less than 50 pixels (625 μm).

Using the first assessment value EV1 (see equation (b)), the second assessment value EV2 (see equation (c)), and the third assessment value EV3 (see equations (d) and (e)), the noise characteristics of the first electroconductive sheet 10A and the second electroconductive sheet 10B can be quantified in various ways, for thereby appropriately assessing the quality of images that are transmitted through the first electroconductive sheet 10A and the second electroconductive sheet 10B. Consequently, each of the first assessment value EV1, the second assessment value EV2, and the third assessment value EV3 can be interpreted as an image quality assessment value.

The present invention is not limited to the embodiment described above. Various changes may be made thereto without departing from the spirit of the present invention.

Figure 14:
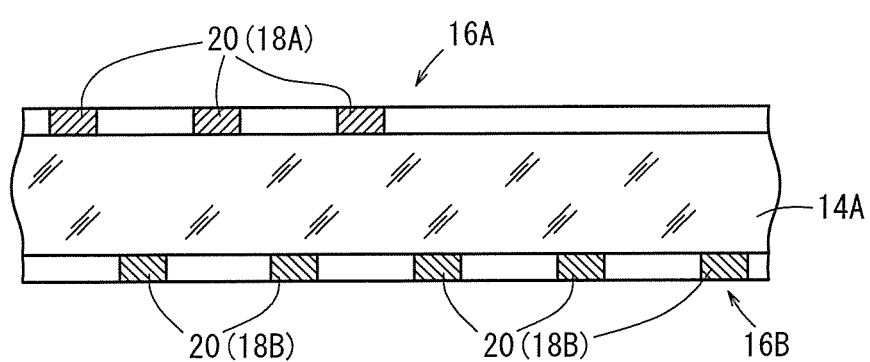
FIG. 14 is a schematic vertical cross-sectional view of a laminated electroconductive sheet according to another embodiment of the present invention, which differs from the laminated electroconductive sheet shown in FIG. 3.

For example, as shown in FIGS. 2 and 3, the laminated electroconductive sheet 12 includes the first electroconductive area 16A on one principal surface of the first transparent base 14A and the second electroconductive area 16B on one principal surface of the second transparent base 14B, and the first electroconductive area 16A and the second electroconductive area 16B are stacked on each other. However, as shown in FIG. 14, the first electroconductive area 16A may be disposed on one principal surface of the first transparent base 14A, and the second electroconductive area 16B may be disposed on another principal surface of the first transparent base 14A. In this case, the second transparent base 14B does not exist, the first transparent base 14A is stacked on the second electroconductive area 16B, and the first electroconductive area 16A is stacked on the first transparent base 14A.

The first electroconductive area 16A and the second electroconductive area 16B may be disposed in facing relation to each other with the OCA 30 interposed therebetween. Further, the first electroconductive area 16A and the second electroconductive area 16B may be disposed on one principal surface of a transparent base. In this case, the first electroconductive area 16A and the second electroconductive area 16B are insulated from each other by a space or a dummy pattern.

INVENTIVE EXAMPLES

Inventive examples of the present invention will be described below in specific detail. The materials, amounts used, ratios, processing details, and processing sequences described in the inventive examples can be changed without departing from the spirit of the present invention. Therefore, the scope of the present invention shall not be interpreted as being restricted by the specific examples described below.

[OCA]

According to Table 1, principal components and 0.04 parts by weight of IRGACURE 651 (trademark of 2,2-dimethoxy-2-phenylacetophenon manufactured by Ciba Japan, hereinafter referred to as "Irg651") as a photopolymerization initiator were weighed and mixed together suitably in a glass container, and a nitrogen gas was substituted for dissolved oxygen, after which the solution was irradiated with ultraviolet rays for several minutes by a low-pressure mercury lamp in order to bring about partial polymerization, thereby obtaining a viscous liquid having a viscosity of about 1500 cP. 0.15 parts by weight of an additional photopolymerization initiator (Irg651) were added to the obtained composition, and the composition was stirred sufficiently. After the mixture was defoamed in a vacuum, the mixture was applied to a polyester film (peel-off film), which was 50 μm thick, and was subjected to a peeling process, such that a film thickness of 100 μm was achieved after drying. The coated film was covered with a peel-off film in order to remove oxygen, which would impair polymerization. Both sides of the assembly were irradiated for about four minutes by a low-pressure mercury lamp, thereby obtaining a transparent adhesive sheet. The value of tan δ and the storage elastic modulus of the obtained sheet were measured according to the process described below. The results of such measurements are shown below in Table 1.

TABLE 1

| Examples of synthesis | Main components | | | | | | | | | | Initiator, cross-linking agents | |
|---|---|---|---|---|---|---|---|---|---|---|---|---|
| | 2EHA | IOA | BA | ICA | IBXA | AA | DAAM | V#190 | HEA | HPA | Irg651 | V-65 |
| 1 | 80.0 | | | | | 5.0 | | 15.0 | | | 0.04 | |
| 2 | 80.0 | | | | | 5.0 | | 15.0 | | | 0.04 | |
| 3 | 80.0 | | | | | 5.0 | | 15.0 | | | 0.04 | |
| 4 | 80.0 | | | | | 5.0 | | 15.0 | | | 0.04 | |
| 5 | 80.0 | | | | | 5.0 | | 15.0 | | | 0.04 | |
| 6 | 80.0 | | | | | | 5.0 | 15.0 | | | 0.04 | |
| 7 | 87.0 | | | | | 9.0 | | 4.0 | | | 0.04 | |
| 8 | | 87.5 | | | | 10.0 | | | 2.5 | | 0.04 | |
| 9 | | 87.5 | | | | 4.0 | | | | 8.5 | 0.04 | |
| 10 | | | 87.5 | | | 4.0 | | | | 8.5 | 0.04 | |
| 11 | 90.0 | | | | | 5.0 | | | | | 0.04 | |
| 12 | 47.0 | | | 23.0 | | 10.0 | | 20.0 | | | 0.04 | |
| 13 | 75.0 | | | | 5.0 | 5.0 | | 15.0 | | | 0.04 | |
| 14 | 70.0 | | | | 10.0 | 5.0 | | 15.0 | | | 0.04 | |
| 15 | 65.0 | | | | 15.0 | 5.0 | | 15.0 | | | 0.04 | |
| 16 | 55.0 | | | | 25.0 | 5.0 | | 15.0 | | | 0.04 | |
| 17 | 50.0 | | | | 30.0 | 5.0 | | 15.0 | | | 0.04 | |
| 18 | 65.0 | | | | | 5.0 | | 15.0 | 15.0 | | 0.04 | |
| 19 | 58.0 | | | | 25.0 | 2.0 | | 15.0 | | | | 0.10 |
| 20 | 48.0 | | | | 25.0 | 2.0 | | 25.0 | | | | 0.10 |
| 21 | 43.0 | | | | 30.0 | 2.0 | | 25.0 | | | | 0.10 |
| 22 | 48.0 | | | | 25.0 | 2.0 | | 25.0 | | | | 0.10 |
| 23 | 48.0 | | | | 25.0 | 2.0 | | 25.0 | | | | 0.10 |
| 24 | 48.0 | | | | 25.0 | 2.0 | | 25.0 | | | | 0.10 |

| Examples of synthesis | Initiator, cross-linking agents | | | MGI | | tanδ | Storage elastic modulus × $10^4$ Pa |
|---|---|---|---|---|---|---|---|
| | HDDA | L-45 | Irg651[*] | Compound | Content | | |
| 1 | | | 0.15 | | | 0.59 | 4.3 |
| 2 | 0.025 | | 0.15 | | | 0.34 | 4.5 |
| 3 | 0.060 | | 0.15 | | | 0.19 | 5.0 |
| 4 | 0.100 | | 0.15 | | | 0.13 | 5.0 |
| 5 | 0.125 | | 0.15 | | | 0.11 | 4.5 |
| 6 | 0.100 | | 0.15 | | | 0.09 | 3.0 |
| 7 | 0.025 | | 0.15 | | | 0.34 | 9.1 |
| 8 | 0.100 | | 0.10 | | | 0.15 | 8.9 |
| 9 | 0.100 | | 0.10 | | | 0.22 | 8.1 |
| 10 | 0.100 | | 0.15 | | | 0.26 | 7.0 |
| 11 | 0.100 | | 0.10 | | | 0.22 | 4.9 |
| 12 | 0.025 | | 0.15 | | | 0.44 | 6.3 |
| 13 | 0.025 | | 0.15 | | | 0.26 | 3.5 |
| 14 | 0.060 | | 0.15 | | | 0.27 | 3.1 |
| 15 | 0.060 | | 0.15 | | | 0.28 | 2.7 |
| 16 | 0.060 | | 0.15 | | | 0.26 | 3.3 |
| 17 | 0.060 | | 0.15 | | | 0.24 | 3.6 |
| 18 | 0.060 | | 0.15 | | | 0.26 | 4.7 |
| 19 | | 0.700 | | | | 0.24 | 5.3 |
| 20 | | 0.700 | | | | 0.22 | 5.8 |
| 21 | | 0.700 | | | | 0.20 | 6.4 |
| 22 | | 0.700 | | a | 0.50 | 0.22 | 5.8 |
| 23 | | 0.700 | | b | 0.50 | 0.22 | 5.8 |
| 24 | | 0.700 | | c | 0.50 | 0.22 | 5.8 |

[*] Additional Initiator

[Process of Measuring Storage Elastic Modulus and Tan δ (Loss Tangent) (Dynamic Viscoelastic Characteristics)]
(Sample Production)

A sheet having a thickness of about 3 mm, on which the transparent adhesive sheet fabricated according to the above process was stacked, was blanked by a blanking blade having a diameter of 7.9 mm, thereby obtaining a cylindrical sample.

(Measurement)

The dynamic viscoelastic characteristics were measured using an Advanced Rheometric Expansion System (ARES) manufactured by Rheometric Scientific, Inc. The utilized sample fixing jig was made up of parallel plates having a diameter of 7.9 mm. The sample, which was fabricated as described above, was placed between the parallel plates and tension was adjusted. The dynamic viscoelastic characteristics were measured in air within a temperature range of −50° C. to 200° C. and at a temperature rising rate of 5° C. per minute in a shearing mode at a frequency of 1.0 Hz. The storage elastic modulus G' (Pa) at 25° C. and the loss tangent tan δ at 140° C. were determined.

Specific substance names of the main components, the initiators or the cross-linking agents, their ratios, the loss coefficients tan δ, and the storage elastic moduli are shown comprehensively in Table 1. The loss tangent tan δ at 25° C.

is smaller than 0.13 in synthesis examples Nos. 5 and 6, and the storage elastic modulus at 140° C. exceeds $8.9 \times 10^4$ Pa in synthesis example No. 7.

2EHA, IOA, BA, ICA, IBXA, AA, DAAM, V#190, HEA, and HPA represent 2-ethylhexyl acrylate, isooctyl acrylate, n-butyl acrylate, isocetyl acrylate, isobornyl acrylate, acrylic acid, diacetone acrylamide, ethoxyethoxyethyl acrylate, 2-hydroxyethyl acrylate, and 2-hydroxypropyl acrylate, respectively. Irg651 and V-65 represent polymerization initiators manufactured by BASF Japan and Wako Pure Chemical Industries, Ltd. HDDA (1,6-hexanediol acrylate) and L-45 (isocyanate) represent cross-linking agents.

Compound a is DL-α-tocopherol with a reduction potential of 0.56 V. Compound b and compound c are substances with structures that are represented, respectively, by the following formulas (6) and (7), and having reduction potentials of 1.09 V and 1.17 V, respectively.

Compound b

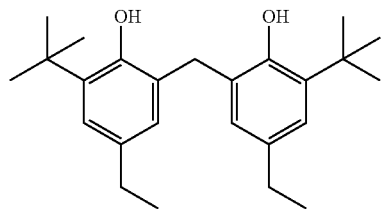

Formula (6)

Compound c

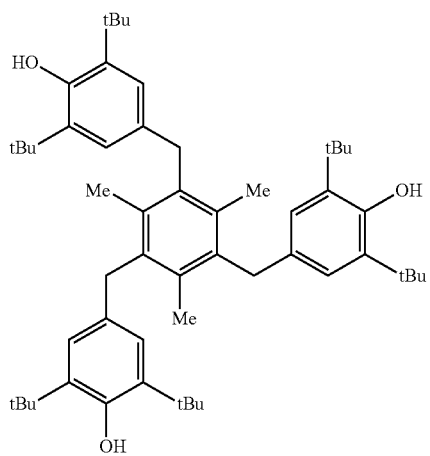

Formula (7)

[Fabrication 1—V Mode for Assessment Base]

Figure 15:
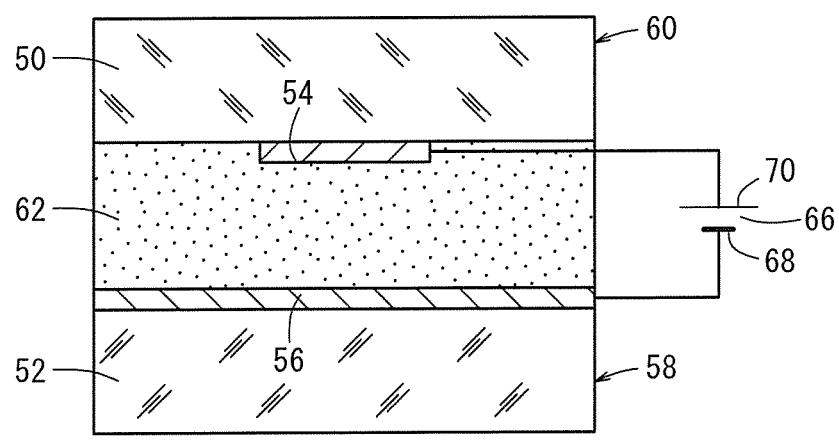
FIG. 15 is a schematic vertical cross-sectional view of a base for V mode assessment.

Fine silver lines were patterned respectively on the PET bases 50 and 52 shown in FIG. 15 by a microcontact printing patterning process, according to the procedure described in Japanese Laid-Open Patent Publication No. 2012-519329 (PCT), paragraph [0104], thereby forming an anode 54 and a cathode 56 having an elongate mesh-like structure, and thus fabricating the electroconductive sheets 58 and 60. The mesh pattern (cell shape) was random with no regularity (uniformity).

Figure 16:
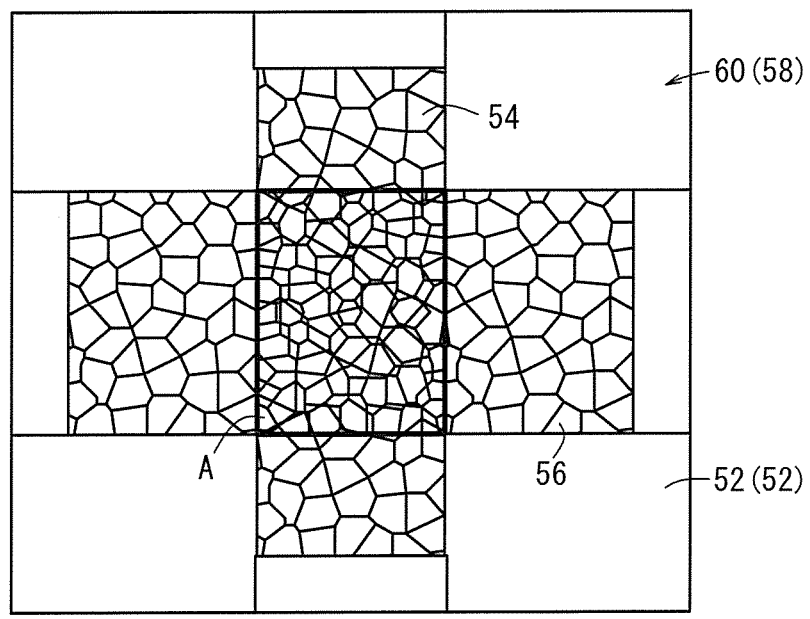
FIG. 16 is a schematic plan view of the base for V mode assessment.

One principal surface (the surface on which the anode 54 was formed) of the electroconductive sheet 58 was coated to 100 μm thickness with an OCA 62 of any one of synthesis examples Nos. 1 through 24 shown in Table 1. Thereafter, as shown in FIG. 16, the electroconductive sheet 60 was placed on the OCA 62 such that the cathode 56 and the anode 54 confronted each other perpendicularly, to thereby obtain the V-mode assessment base 64. A negative pole 68 and a positive pole 70 of a DC power supply 66 (voltage: 15 V) were electrically connected, respectively, to the cathode 56 and the anode 54.

The area of an overlapping portion A (surrounded by the thick lines) where the anode 54 and the cathode 56 cross each other was 9 mm².

[Fabrication 2—H Mode for Assessment Base]

Figure 17:
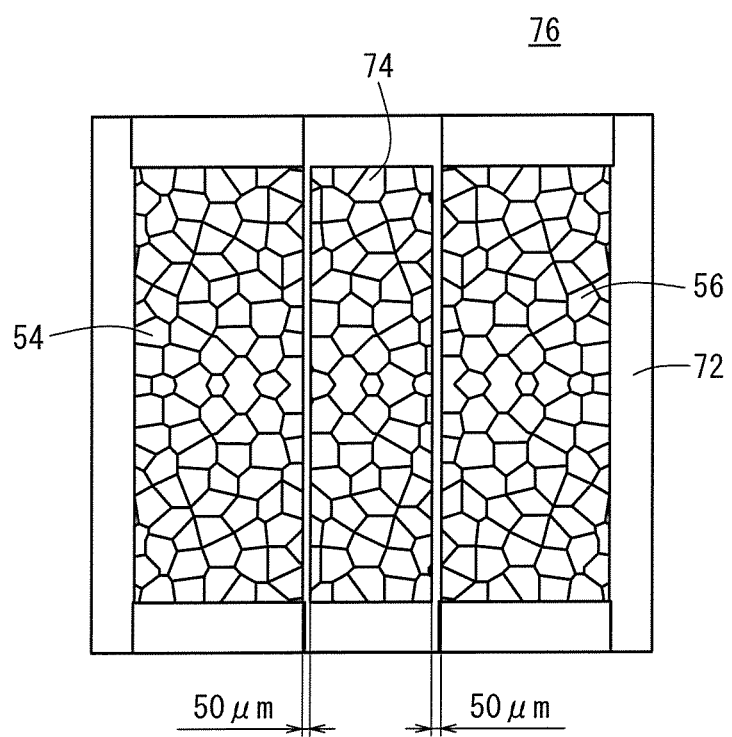
FIG. 17 is a schematic plan view of a base for H mode assessment.

Fine silver lines were patterned respectively on the PET base 72 shown in FIG. 17 by a microcontact printing patterning process, according to the procedure described in Japanese Laid-Open Patent Publication No. 2012-519329 (PCT), paragraph [0104], thereby forming an anode 54, a dummy electrode 74, and a cathode 56 having an elongate parallel mesh-like structure, and thus fabricating the electroconductive sheet 76. The cells were of a random shape. The widthwise dimension of the anode 54 and the cathode 56 was 3 mm, the widthwise dimension of the dummy electrode 74 was 2 mm, a clearance (spaced distance) between the anode 54 and the dummy electrode 74 was 50 μm, and a clearance (spaced distance) between the dummy electrode 74 and the cathode 56 was 50 μm.

Figure 18:
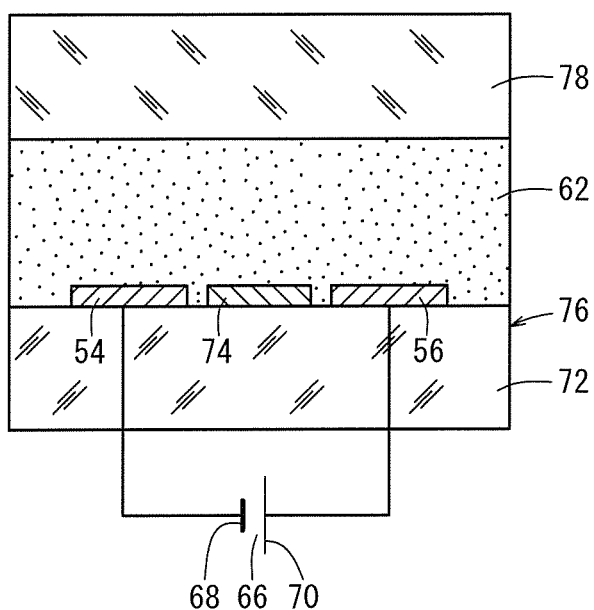
FIG. 18 is a schematic vertical cross-sectional view of the base for H mode assessment.

As shown in FIG. 18, the OCA 62, which was 100 μm thick and composed of any one of the synthesis examples Nos. 1 through 24 shown in Table 1, was applied to one principal surface (the surface on which the anode 54, the dummy electrode 74, and the cathode 56 were formed) of the electroconductive sheet 76. Thereafter, a PET base 78 was placed on the OCA 62, to thereby obtain the H-mode assessment base 80. Similar to the case of the V-mode assessment base 64, the negative pole 68 and the positive pole 70 of the DC power supply 66 (voltage: 15 V) were electrically connected, respectively, to the cathode 56 and the anode 54.

In the above examples, the assessment bases were fabricated using a microcontact printing patterning process. However, the assessment bases may be fabricated using a silver salt process. Inventive Example 37, to be described later, was obtained in the same manner as Inventive Example 30, except that the mesh electrodes were fabricated by a silver salt process.

[Evaluation 1—Silver Migration]

Based on a change in the resistance value between the cathode 56 and the anode 54, the V-mode assessment base 64 was assessed for the degree of silver migration. More specifically, the time was measured until the resistance value dropped to $1 \times 10^5 \Omega$ at 80° C. with a relative humidity of 85% under one atmospheric pressure. Examples in which the measured time was 40 hours or greater were assessed as good (A). Examples in which the measured time was 30 hours or greater and less than 40 hours were assessed as falling within an allowable range (B). Examples in which the measured time was less than 30 hours were assessed as insufficient (C).

The H-mode assessment base 80 was assessed for the degree of silver migration, based on the rate of change of the resistance of the anode 54. More specifically, the rate of change of the resistance of the anode 54 was measured after the H-mode assessment base 80 had been energized for 100 hours at 80° C. with a relative humidity of 85% under one atmospheric pressure. Examples in which the measured range of change of the resistance was less than 5% were assessed as good (A). Examples in which the measured range of change of the resistance was 5% or greater and less than 10% were assessed as falling within an allowable range (B). Examples in which the measured range of change of the resistance was 10% or greater were assessed as insufficient (C).

[Evaluation 2—Moire Phenomena and Color Noise]

The V-mode assessment base 64 and the H-mode assessment base 80 were placed on a color liquid crystal display having a size of 11.6 inches, 1366×768 dots, and a pixel pitch of 194 μm, and the color liquid crystal display was energized in order to display a white image. The V-mode assessment base 64 and the H-mode assessment base 80 were organoleptically assessed for moire phenomena and color noise. The examples were assessed in four stages. More specifically, examples in which moire phenomena and color noise were very good were assessed as (A). Examples in which moire phenomena and color noise were good were assessed as (B). Examples in which moire phenomena and color noise were visible but within an allowable range were assessed as (C). Examples in which moire phenomena and color noise were unfavorably visible were assessed as (D).

[Evaluation 3—Whitening]

Figure 19:
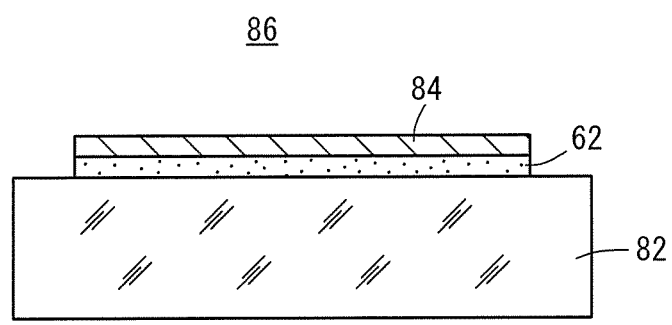
FIG. 19 is a schematic side elevational view of a base for a whitening assessment test.

As shown in FIG. 19, a PET base 84 having a thickness of 50 μm was placed on one principal surface of a glass base 82, with an OCA 62 of any one of the synthesis examples Nos. 1 through 24 shown in Table 1 being interposed therebetween, in order to produce a base 86 for a whitening assessment test. Thereafter, the base 86 was exposed for 72 hours to an environment having a temperature of 65° C. and a relative humidity of 95%, and further was exposed to an environment having a temperature of 23° C. and a relative humidity of 50%. The time was measured until the haze reached a level of 3% or less. HR-100 manufactured by Murakami Color Research Laboratory was used to perform this measurement.

The haze (%) was measured in the following manner. The peel-off PET film provided on one surface of a transparent double-sided adhesive sheet, which was obtained as described above, was peeled off, and the adhesive surface was applied to an optical PET film (COSMOSHINE manufactured by Toray Industries, Ltd.). The other peel-off PET film was peeled off, and the adhesive surface was applied to glass (EAGLE XG manufactured by Dow Corning). After such an assembly was exposed to conditions of 50° C. and five atmospheric pressures for thirty minutes, the assembly was left standing still for 24 hours under conditions of 25° C. and a relative humidity of 50%. Thereafter, the haze was measured using a haze meter MODEL TC-H3 manufactured by Tokyo Denshoku Co., Ltd.

Examples for which the time until the haze reached 3% or less was 6 hours were assessed as good (A). Examples for which the time until the haze reached 3% or less ranged from 6 to 12 hours were assessed as falling in an allowable range (B). Examples for which the time until the haze reached 3% or less was in excess of 12 hours were assessed as defective (C).

[Results of Assessment]

The results of the assessment, together with the assessment values EV1, EV2, EV3, the line widths of the cells, the synthesis example numbers, the property values of the OCA 62 that was used therewith, and overall ratings are shown together in Table 2 as Inventive Examples 1 through 21 and Comparative Examples 1 through 3. It can be understood from Table 2 that it is possible to obtain a touch panel, which prevents migration from occurring, and which suppresses moire phenomena and color noise, by employing mesh electrodes in which the cells are of a random pattern, and the standard deviation of the areas lies within a range of 0.017 mm$^2$ to 0.038 mm$^2$, together with using an OCA 62 in which the loss coefficient (tan δ) is 0.13 or greater and the storage elastic modulus is 8.9×10$^4$ Pa or less.

TABLE 2

| | Mesh electrodes | | | | OCA | | | Migration assessment | | Visibility assessment | | | |
|---|---|---|---|---|---|---|---|---|---|---|---|---|---|
| | EV1 (mm$^2$) | EV2 | EV3 (μm) | Line width | No. | Storage elastic modulus × 10$^4$ Pa | tanδ | V mode | H mode | Moire | Color noise | Whitening | Overall rating |
| Example 1 | 0.022 | 1.05 | 54.6 | 10 μm | 1 | 4.3 | 0.59 | B | A | A | A | B | A |
| Example 2 | ↑ | ↑ | ↑ | ↑ | 2 | 4.5 | 0.34 | B | A | A | A | B | A |
| Example 3 | ↑ | ↑ | ↑ | ↑ | 3 | 5.0 | 0.19 | B | B | A | A | B | A |
| Example 4 | ↑ | ↑ | ↑ | ↑ | 4 | 5.0 | 0.13 | B | B | A | A | B | A |
| Comparative Example 1 | ↑ | ↑ | ↑ | ↑ | 5 | 4.5 | 0.11 | C | B | A | A | B | C |
| Comparative Example 2 | ↑ | ↑ | ↑ | ↑ | 6 | 3.0 | 0.09 | C | B | A | A | B | C |
| Comparative Example 3 | ↑ | ↑ | ↑ | ↑ | 7 | 9.1 | 0.34 | C | B | A | A | B | C |
| Example 5 | ↑ | ↑ | ↑ | ↑ | 8 | 8.9 | 0.15 | B | B | A | A | B | A |
| Example 6 | ↑ | ↑ | ↑ | ↑ | 9 | 8.1 | 0.22 | B | B | A | A | B | A |
| Example 7 | ↑ | ↑ | ↑ | ↑ | 10 | 7.0 | 0.26 | B | A | A | A | B | A |
| Example 8 | ↑ | ↑ | ↑ | ↑ | 11 | 4.9 | 0.22 | B | A | A | A | B | A |
| Example 9 | ↑ | ↑ | ↑ | ↑ | 12 | 6.3 | 0.44 | B | A | A | A | C | A |
| Example 10 | ↑ | ↑ | ↑ | ↑ | 13 | 3.5 | 0.26 | B | A | A | A | B | A |
| Example 11 | ↑ | ↑ | ↑ | ↑ | 14 | 3.1 | 0.27 | B | A | A | A | B | A |
| Example 12 | ↑ | ↑ | ↑ | ↑ | 15 | 2.7 | 0.28 | B | A | A | A | B | A |
| Example 13 | ↑ | ↑ | ↑ | ↑ | 16 | 3.3 | 0.26 | B | A | A | A | B | A |
| Example 14 | ↑ | ↑ | ↑ | ↑ | 17 | 3.6 | 0.24 | B | A | A | A | B | A |
| Example 15 | ↑ | ↑ | ↑ | ↑ | 18 | 4.7 | 0.26 | B | A | A | A | A | A |
| Example 16 | ↑ | ↑ | ↑ | ↑ | 19 | 5.3 | 0.24 | B | A | A | A | A | A |
| Example 17 | ↑ | ↑ | ↑ | ↑ | 20 | 5.8 | 0.22 | B | A | A | A | A | A |
| Example 18 | ↑ | ↑ | ↑ | ↑ | 21 | 6.4 | 0.20 | B | A | A | A | A | A |
| Example 19 | ↑ | ↑ | ↑ | ↑ | 22 | 6.4 | 0.20 | A | A | A | A | A | A |
| Example 20 | ↑ | ↑ | ↑ | ↑ | 23 | 6.4 | 0.20 | A | A | A | A | A | A |
| Example 21 | ↑ | ↑ | ↑ | ↑ | 24 | 6.4 | 0.20 | A | A | A | A | A | A |

The above assessment was performed using the OCA 62 of any one of synthesis examples No. 20, 8, and 7, while varying the assessment values EV2 to EV3 (the standard deviation of the cell areas) of the cells or the line width, etc. The results are shown collectively in Table 3 as Inventive Examples 22 through 36 and Comparative Examples 4 through 9. It can be understood from Table 3 that it is possible to obtain a touch panel in which migration, moire phenomena, color noise, and whitening are good or lie within allowable ranges, by keeping the standard deviation of the cell areas within a range of 0.017 mm² to 0.038 mm².

TABLE 3

| | Mesh electrodes | | | | OCA | | | Migration assessment | | Visibility assessment | | | |
|---|---|---|---|---|---|---|---|---|---|---|---|---|---|
| | EV1 (mm²) | EV2 | EV3 (μm) | Line width | No. | Storage elastic modulus × 10⁴ Pa | tanδ | V mode | H mode | Moire | Color noise | Whitening | Overall rating |
| Comparative Example 4 | 0.016 | 1.05 | 54.6 | 10 μm | 20 | 5.8 | 0.22 | B | B | C | D | A | C |
| Example 22 | 0.017 | ↑ | ↑ | ↑ | ↑ | ↑ | ↑ | B | A | B | C | A | A |
| Example 23 | 0.019 | ↑ | ↑ | ↑ | ↑ | ↑ | ↑ | B | A | A | B | A | A |
| Example 24 | 0.020 | ↑ | ↑ | ↑ | ↑ | ↑ | ↑ | B | A | A | A | A | A |
| Example 25 | 0.022 | ↑ | ↑ | ↑ | ↑ | ↑ | ↑ | B | A | A | A | A | A |
| Example 26 | 0.023 | ↑ | ↑ | ↑ | ↑ | ↑ | ↑ | B | A | A | B | A | A |
| Example 27 | 0.027 | ↑ | ↑ | ↑ | ↑ | ↑ | ↑ | B | A | A | B | A | A |
| Example 28 | 0.032 | ↑ | ↑ | ↑ | ↑ | ↑ | ↑ | B | A | A | C | A | A |
| Example 29 | 0.038 | ↑ | ↑ | ↑ | ↑ | ↑ | ↑ | B | A | A | C | A | A |
| Comparative Example 5 | 0.041 | ↑ | ↑ | ↑ | ↑ | ↑ | ↑ | C | B | B | D | A | C |
| Comparative Example 6 | 0.016 | 1.07 | 6.4 | ↑ | ↑ | ↑ | ↑ | B | A | D | D | A | C |
| Example 30 | 0.017 | 1.06 | 15.0 | ↑ | ↑ | ↑ | ↑ | B | A | B | C | A | A |
| Example 31 | 0.022 | 1.05 | 54.6 | ↑ | ↑ | ↑ | ↑ | B | A | A | A | A | A |
| Example 32 | 0.038 | 0.97 | 406.3 | ↑ | ↑ | ↑ | ↑ | B | A | B | C | A | A |
| Comparative Example 7 | 0.041 | 0.96 | 2.0 | ↑ | ↑ | ↑ | ↑ | B | B | D | D | A | C |
| Example 33 | 0.038 | 0.97 | 406.3 | 4 μm | ↑ | ↑ | ↑ | B | A | B | B | A | A |
| Example 34 | 0.038 | 0.97 | 406.3 | 4 μm | 8 | 8.9 | 0.15 | B | B | B | B | B | A |
| Comparative Example 8 | 0.038 | 0.97 | 406.3 | 4 μm | 7 | 9.1 | 0.34 | C | C | B | B | B | C |
| Example 35 | 0.038 | 0.97 | 406.3 | 2 μm | ↑ | ↑ | ↑ | B | B | B | A | A | A |
| Example 36 | 0.038 | 0.97 | 406.3 | 2 μm | 8 | 8.9 | 0.15 | B | B | B | A | B | A |
| Comparative Example 9 | 0.038 | 0.97 | 406.3 | 2 μm | 7 | 9.1 | 0.34 | C | C | B | A | B | C |
| Example 37 | 0.017 | 1.06 | 15.0 | 10 μm | 20 | 5.8 | 0.22 | B | A | B | C | A | A |

* Example 37 had mesh electrodes fabricated by the silver salt

As made clear from Example 37, the mesh electrodes that are fabricated by a silver salt process offer the same advantages as the mesh electrodes that are fabricated by a micro-contact printing patterning process.

The invention claimed is:

1. A touch panel having a first electrode layer and a second electrode layer, which face each other with an insulating layer interposed therebetween, wherein:
    the first electrode layer includes a plurality of first electrodes extending along a first direction and arrayed parallel to each other along a second direction perpendicular to the first direction;
    the second electrode layer includes a plurality of second electrodes extending along the second direction and arrayed parallel to each other along the first direction;
    at least one of either the first electrodes or the second electrodes comprise a mesh pattern made up of fine silver lines;
    the mesh pattern includes a plurality of cells defined by the fine silver lines crossing each other and having shapes that differ from each other as viewed in plan;
    the cells have respective areas whose standard deviation lies within a range of 0.017 mm² to 0.038 mm²; and
    an adhesive whose loss coefficient tan δ at 140° C. and 1 Hz is 0.13 or greater, and whose storage elastic modulus at 25° C. and 1 Hz is 8.9×10⁴ Pa or less is disposed on at least one of either the first electrodes or the second electrodes that comprise the mesh pattern and the insulating layer, wherein the adhesive contains a migration inhibitor comprising at least either one of a phenolic compound or a mercapto-group-containing heterocyclic compound.

2. The touch panel according to claim 1, wherein the mesh pattern is made up of a combination of the first electrodes and the second electrodes.

3. The touch panel according to claim 1, wherein each of the fine silver lines has a widthwise dimension of 4 μm or less.

4. The touch panel according to claim 1, wherein the adhesive contains the following components (A) through (C):
    (A): An alkyl (meth)acrylate monomer whose glass transition temperature Tg is 25° C. or lower, wherein the alkyl group has 4 through 18 carbon atoms;
    (B): An ester of (meth)acrylate monomer whose glass transition temperature Tg is in excess of 25° C.; and
    (C): A monomer selected from a group of hydroxyalkyl (meth)acrylate, unsubstituted (meth)acrylamide, N-alkyl-substituted (meth)acrylamide, N,N-dialkyl-substituted (meth)acrylamide, a monomer having a urea functional group, and a monomer having a lactam functional group, a tertiary amine, an alicyclic amine, an aromatic amine, or a combination of such materials.

5. The touch panel according to claim 1, wherein at least either one of the first electrodes or the second electrodes, which comprise the mesh pattern, are formed by a microcontact printing patterning process or a silver salt process.

6. A display device including the touch panel according to claim 1.

* * * * *